(12) United States Patent
Taylor et al.

(10) Patent No.: US 10,511,805 B2
(45) Date of Patent: Dec. 17, 2019

(54) METHODS AND SYSTEMS FOR MULTI-PANE VIDEO COMMUNICATIONS TO EXECUTE USER WORKFLOWS

(71) Applicant: ALEXANDER MACKENZIE & PRANGER, Sandy, UT (US)

(72) Inventors: Jed W. Taylor, South Jordan, UT (US); Timothy Eugene Pranger, Eagle Mountain, UT (US)

(73) Assignee: Popio IP Holdings, LLC, Sandy, UT (US)

( * ) Notice: Subject to any disclaimer, the term of this patent is extended or adjusted under 35 U.S.C. 154(b) by 0 days.

(21) Appl. No.: 16/160,379

(22) Filed: Oct. 15, 2018

(65) Prior Publication Data
US 2019/0052840 A1 Feb. 14, 2019

Related U.S. Application Data

(63) Continuation-in-part of application No. 16/115,037, filed on Aug. 28, 2018, which is a continuation of
(Continued)

(51) Int. Cl.
*H04N 7/14* (2006.01)
*H04N 7/08* (2006.01)
(Continued)

(52) U.S. Cl.
CPC ......... *H04N 7/147* (2013.01); *G06F 3/04842* (2013.01); *G06F 3/1446* (2013.01);
(Continued)

(58) Field of Classification Search
USPC ....................................................... 455/416
See application file for complete search history.

(56) References Cited

U.S. PATENT DOCUMENTS

D619,593 S    7/2010  Fujioka et al.
7,812,988 B2  10/2010 Doo
(Continued)

FOREIGN PATENT DOCUMENTS

EP    2833595 A1    2/2015
WO    WO 2017/180226    10/2017

OTHER PUBLICATIONS

International Search Report & Written Opinion as received in PCTUS2017-016584 dated Apr. 25, 2017.
(Continued)

*Primary Examiner* — Maria El-Zoobi
(74) *Attorney, Agent, or Firm* — Keller Jolley Preece

(57) ABSTRACT

Systems and methods are disclosed for generating a workflow and notifying a user of the workflow using a variety of communication channels. For example, in one or more embodiments, a system generates a workflow comprising a plurality of tasks and one or more display elements corresponding to the workflow tasks. Subsequently, the system sends a first notification to a user regarding the first task via a first communication channel (e.g., a mobile application) and sends a second notification via a second communication channel (e.g., email). If the system receives a user selection of one of the notifications from a client device associated with the user, the system can subsequently provide a first display element corresponding to the first task to the client device via the corresponding communication channel.

20 Claims, 25 Drawing Sheets

US 10,511,805 B2

Page 2

Related U.S. Application Data application No. 15/498,290, filed on Apr. 26, 2017, now Pat. No. 10,091,459, which is a continuation of application No. 15/208,576, filed on Jul. 12, 2016, now Pat. No. 9,699,406, which is a continuation-in-part of application No. 29/561,280, filed on Apr. 14, 2016, now Pat. No. Des. 845,972.

(51) Int. Cl.

| | |
|---|---|
| *H04L 29/06* | (2006.01) |
| *G06Q 20/32* | (2012.01) |
| *G06Q 40/02* | (2012.01) |
| *H04N 5/232* | (2006.01) |
| *G06Q 20/04* | (2012.01) |
| *G06F 3/14* | (2006.01) |
| *H04N 5/265* | (2006.01) |
| *G06F 3/0484* | (2013.01) |

(52) U.S. Cl.
CPC ....... *G06Q 20/042* (2013.01); *G06Q 20/3223* (2013.01); *G06Q 40/02* (2013.01); *H04L 65/1069* (2013.01); *H04N 5/23293* (2013.01); *H04N 5/265* (2013.01); *H04N 7/08* (2013.01)

(56) References Cited

U.S. PATENT DOCUMENTS

| | | | |
|---|---|---|---|
| 8,117,562 B2 | 2/2012 | Getsch | |
| D670,716 S | 11/2012 | Majeed et al. | |
| 8,433,650 B1 * | 4/2013 | Thomas | G06Q 10/06 705/38 |
| D700,912 S | 3/2014 | Kim | |
| 8,782,043 B2 | 7/2014 | Chisholm et al. | |
| 8,789,094 B1 | 7/2014 | Singh et al. | |
| 8,890,685 B1 | 11/2014 | Sookman et al. | |
| 8,924,465 B1 | 12/2014 | Tunguz-Zawislak | |
| 8,955,743 B1 | 2/2015 | Block et al. | |
| D725,133 S | 3/2015 | Smirin et al. | |
| D725,665 S | 3/2015 | Tseng et al. | |
| D726,736 S | 4/2015 | Smirin et al. | |
| D739,867 S | 9/2015 | Faria et al. | |
| D747,733 S | 1/2016 | Scalisi | |
| 9,245,100 B2 | 1/2016 | Marco et al. | |
| D755,812 S | 5/2016 | Lim | |
| D759,662 S | 6/2016 | Panjabi | |
| D760,259 S | 6/2016 | Watson | |
| D762,231 S | 7/2016 | Pearson | |
| D762,676 S | 8/2016 | Lim | |
| D762,686 S | 8/2016 | Lee et al. | |
| D763,872 S | 8/2016 | Tussy | |
| D765,683 S | 9/2016 | Peng | |
| D767,601 S | 9/2016 | Zhou | |
| D768,148 S | 10/2016 | Jung et al. | |
| D769,921 S | 10/2016 | Smith | |
| D770,487 S | 11/2016 | Li | |
| D770,488 S | 11/2016 | Li | |
| D774,061 S | 12/2016 | Wu | |
| D776,147 S | 1/2017 | Simmons et al. | |
| D777,733 S | 1/2017 | Loosli et al. | |
| D779,540 S | 2/2017 | Rad et al. | |
| D780,787 S | 3/2017 | Gomez | |
| D781,311 S | 3/2017 | Rad et al. | |
| D781,874 S | 3/2017 | Dunn | |
| D789,389 S | 6/2017 | Kim et al. | |
| D789,395 S | 6/2017 | Weeresinghe | |
| D789,956 S | 6/2017 | Ortega et al. | |
| D790,578 S | 6/2017 | Hatzikostas | |
| 9,699,406 B1 | 7/2017 | Pranger et al. | |
| D793,427 S | 8/2017 | Sun | |
| D797,118 S | 9/2017 | Van Every et al. | |
| D803,851 S | 11/2017 | Vazquez | |
| 9,820,085 B1 | 11/2017 | Telang et al. | |
| 10,091,459 B2 | 10/2018 | Pranger et al. | |
| D845,972 S | 4/2019 | Pranger et al. | |
| 2005/0149630 A1 | 7/2005 | Smolinski et al. | |
| 2006/0114315 A1 | 6/2006 | Crook | |
| 2006/0152594 A1 | 7/2006 | Landschaft et al. | |
| 2007/0067267 A1 | 3/2007 | Ives | |
| 2007/0093241 A1 | 4/2007 | Oh et al. | |
| 2008/0075067 A1 * | 3/2008 | Guglielmi | H04W 76/15 370/352 |
| 2009/0313167 A1 | 12/2009 | Dujari et al. | |
| 2010/0053302 A1 | 3/2010 | Ivashin et al. | |
| 2010/0073454 A1 | 3/2010 | Lovhaugen et al. | |
| 2011/0249073 A1 | 10/2011 | Cranfill et al. | |
| 2012/0017149 A1 | 1/2012 | Lai et al. | |
| 2012/0030741 A1 | 2/2012 | Chai et al. | |
| 2012/0079419 A1 * | 3/2012 | Ajitomi | G06F 9/542 715/781 |
| 2012/0251985 A1 | 10/2012 | Steels et al. | |
| 2012/0296747 A1 | 11/2012 | Triola | |
| 2013/0013499 A1 | 1/2013 | Kalgi | |
| 2013/0083066 A1 | 4/2013 | Aoki et al. | |
| 2013/0203345 A1 | 8/2013 | Fisher | |
| 2014/0022328 A1 | 1/2014 | Gechter et al. | |
| 2014/0051402 A1 | 2/2014 | Qureshi | |
| 2014/0063174 A1 | 3/2014 | Junuzovic et al. | |
| 2014/0106721 A1 * | 4/2014 | Calman | H04M 3/56 455/416 |
| 2014/0214967 A1 | 7/2014 | Baba et al. | |
| 2015/0026351 A1 | 1/2015 | Calman et al. | |
| 2015/0149536 A1 | 5/2015 | Nishikawa et al. | |
| 2015/0149565 A1 | 5/2015 | Ahmed | |
| 2015/0227298 A1 | 8/2015 | Kim et al. | |
| 2015/0234636 A1 | 8/2015 | Barnes | |
| 2015/0256695 A1 | 9/2015 | Showering et al. | |
| 2015/0304196 A1 | 10/2015 | Sun et al. | |
| 2015/0326729 A1 | 11/2015 | Paolini-Subramanya | |
| 2015/0334344 A1 | 11/2015 | Shoemake | |
| 2015/0350446 A1 | 12/2015 | Glass et al. | |
| 2016/0006817 A1 | 1/2016 | Mitic et al. | |
| 2016/0100298 A1 | 4/2016 | Peterson | |
| 2016/0104122 A1 | 4/2016 | Mande et al. | |
| 2016/0192308 A1 | 6/2016 | Turney et al. | |
| 2016/0212255 A1 | 7/2016 | Lee et al. | |
| 2016/0224210 A1 | 8/2016 | Moore et al. | |
| 2016/0300030 A1 | 10/2016 | Vann et al. | |
| 2016/0337424 A1 | 11/2016 | Mandyam | |
| 2016/0378744 A1 | 12/2016 | Xiangli et al. | |
| 2017/0017635 A1 | 1/2017 | Leliwa et al. | |
| 2017/0140504 A1 | 5/2017 | Jeong et al. | |
| 2017/0150223 A9 | 5/2017 | Zaccone et al. | |
| 2017/0171700 A1 | 6/2017 | Sabarez et al. | |
| 2017/0270079 A1 | 9/2017 | Rajwat et al. | |
| 2017/0313262 A1 | 11/2017 | Wisnia et al. | |
| 2017/0366353 A1 | 12/2017 | Struttmann | |
| 2017/0368413 A1 | 12/2017 | Shavit | |
| 2018/0012432 A1 | 1/2018 | Shin et al. | |
| 2018/0018396 A1 | 1/2018 | Roundtree et al. | |
| 2018/0018838 A1 | 1/2018 | Fankhauser et al. | |
| 2018/0035074 A1 | 2/2018 | Barnes | |
| 2018/0048864 A1 | 2/2018 | Taylor et al. | |
| 2018/0048865 A1 | 2/2018 | Taylor et al. | |
| 2018/0054446 A1 | 2/2018 | Modras | |
| 2018/0103341 A1 | 4/2018 | Moiyallah et al. | |
| 2018/0104573 A1 | 4/2018 | Jeffery et al. | |
| 2018/0176272 A1 | 6/2018 | Zur et al. | |
| 2018/0367755 A1 | 12/2018 | Pranger et al. | |

OTHER PUBLICATIONS

U.S. Appl. No. 29/561,280, Jan. 24, 2018, Restriction Requirement.
U.S. Appl. No. 29/561,280, Aug. 14, 2018, Office Action.
U.S. Appl. No. 15/208,576, Nov. 30, 2016, Office Action.
U.S. Appl. No. 15/208,576, Feb. 16, 2017, Office Action.
U.S. Appl. No. 15/208,576, May 8, 2017, Office Action.
U.S. Appl. No. 15/208,576, May 24, 2017, Notice of Allowance.
U.S. Appl. No. 15/498,290, Oct. 19, 2017, Office Action.
U.S. Appl. No. 15/498,290, Mar. 21, 2018, Office Action.
U.S. Appl. No. 15/498,290, Jul. 18, 2018, Notice of Allowance.
U.S. Appl. No. 15/498,290, Aug. 24, 2018, Notice of Allowance.

(56) References Cited

OTHER PUBLICATIONS

U.S. Appl. No. 15/792,040, Apr. 26, 2018, Office Action.
U.S. Appl. No. 15/792,040, Sep. 11, 2018, Office Action.
U.S. Appl. No. 15/793,806, May 9, 2018, Office Action.
U.S. Appl. No. 15/793,806, Sep. 13, 2018, Office Action.
U.S. Appl. No. 15/792,040, Nov. 9, 2018, Notice of Allowance.
U.S. Appl. No. 15/793,806, Nov. 9, 2018, Notice of Allowance.
U.S. Appl. No. 29/561,280, Feb, 6, 2019, Notice of Allowance.
U.S. Appl. No. 16/115,037, Apr. 30, 2019, Office Action.
U.S. Appl. No. 16/115,037, filed Sep. 9, 2019, Office Action.

* cited by examiner

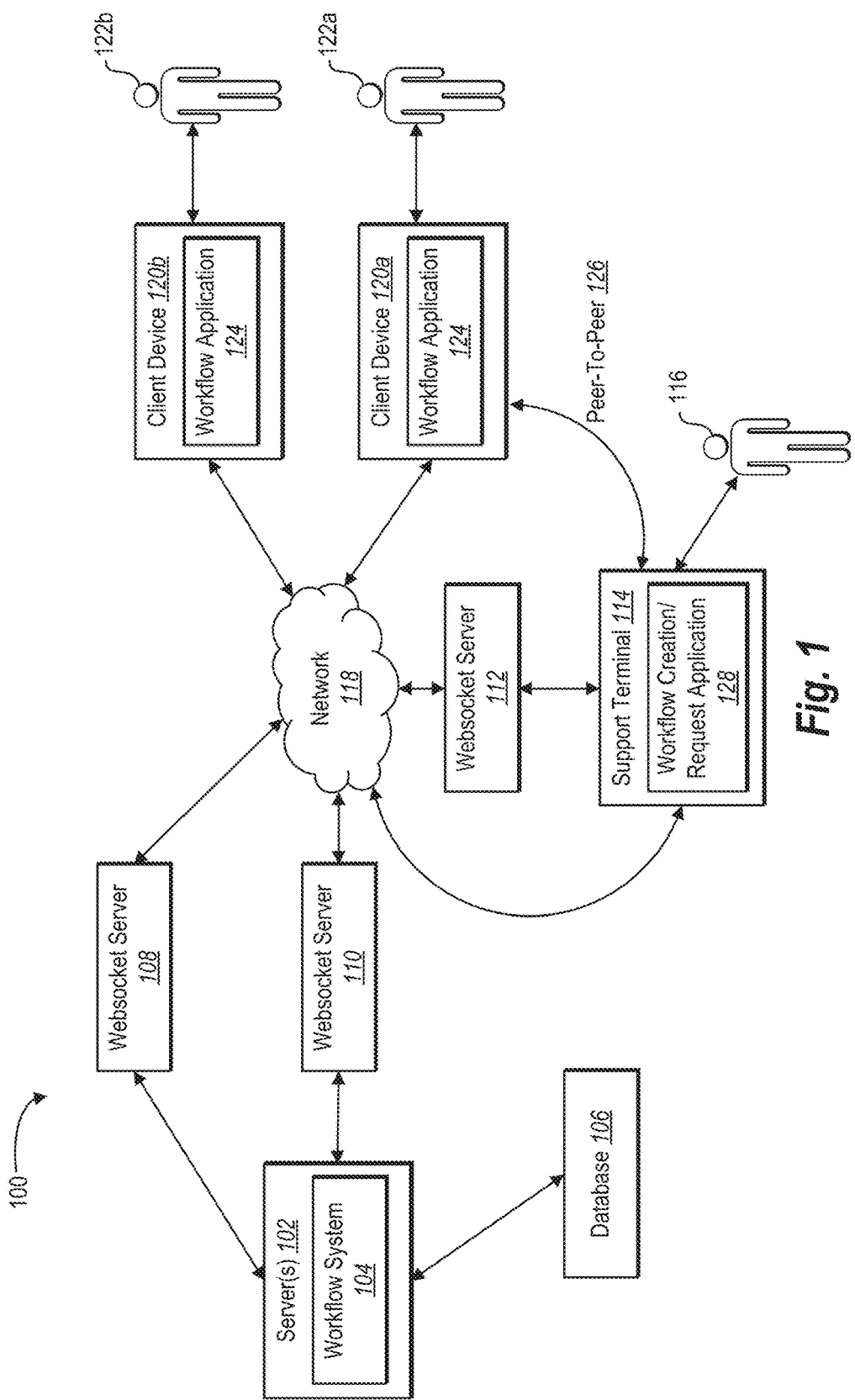

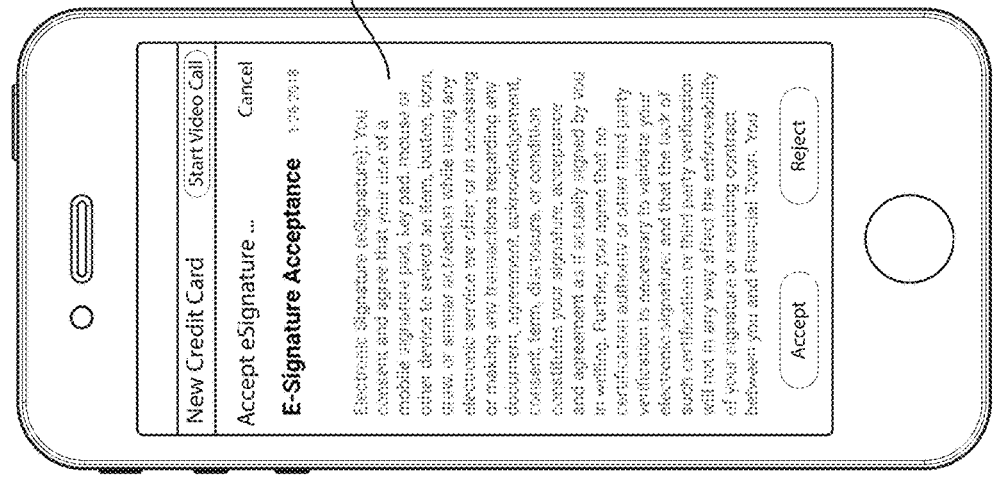
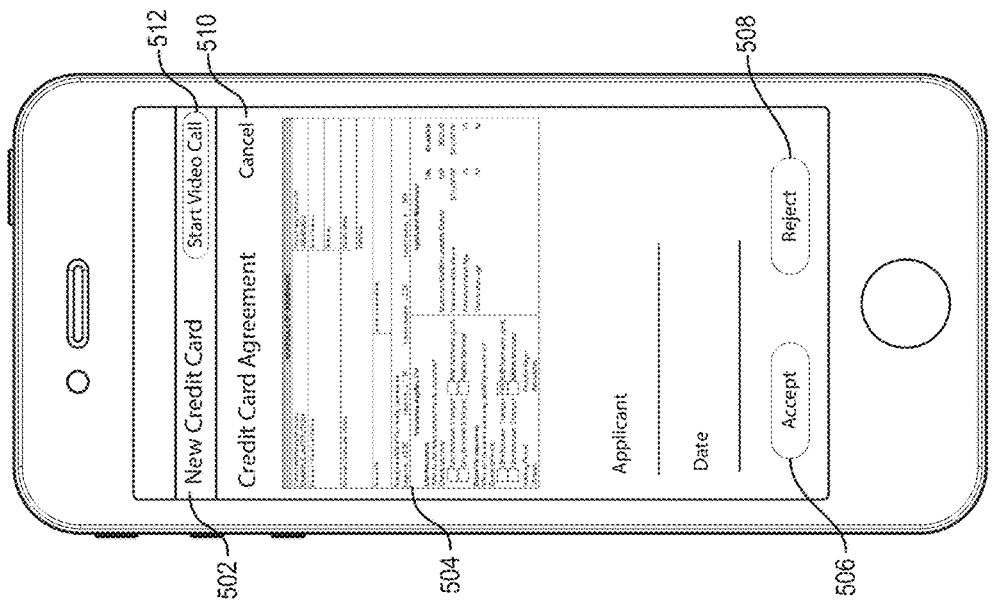
FIG. 5B
FIG. 5A

METHODS AND SYSTEMS FOR MULTI-PANE VIDEO COMMUNICATIONS TO EXECUTE USER WORKFLOWS

CROSS-REFERENCE TO RELATED APPLICATIONS

The present application is a continuation-in-part of U.S. patent application Ser. No. 16/115,037, filed on Aug. 28, 2018, which is a continuation of U.S. patent application Ser. No. 15/498,290, filed on Apr. 26, 2017, now U.S. Pat. No. 10,091,459, which is a continuation of U.S. patent application Ser. No. 15/208,576, filed on Jul. 12, 2016, now U.S. Pat. No. 9,699,406, which is a continuation-in-part of U.S. patent application Ser. No. 29/561,280, filed on Apr. 14, 2016. Each of the aforementioned applications are hereby incorporated by reference in their entirety.

BACKGROUND

Many modern businesses create software applications (e.g., mobile applications) meant to improve accessibility to the business and allow a user to perform some desired function or access information on a client device (e.g., mobile device, laptop, etc.). Some businesses, such as game developers, operate their business solely through the application itself. Other businesses, such as banks, may create a software application merely to provide customers a convenient alternative to visiting a brick and mortar branch of the business. This allows the user flexibility in determining when and where to interact with the business.

Despite these advantages, conventional software applications have several technological shortcomings that create inflexible and inefficient operation. For example, conventional applications are typically inflexible, because they are poorly adapted for inexperienced users. To illustrate, users not familiar with technology in general may not understand how to interact with software applications or their underlying devices to find information or perform a desired function. Consequently, these users are often intimidated and may shy away from or experience frustration when using software applications. Even a user that is technologically savvy may be unfamiliar with a particular software application or the process required to accomplish the desired function. For example, a user may be unaware that applying for a loan requires the user to perform a series of tasks, such as filling out a form, providing a signature, and providing proof of identification. Conventional software applications typically provide few tools (e.g., a FAQs section) to assist the user and may ultimately leave the user to learn the process independently. This can lead to further frustration, which may lead the user to abandon the software application and, possibly, the business-customer relationship altogether.

Further problems of inflexibility of conventional software applications derive from the lack of interpersonal communication between the user and a representative of the business. Because conventional software applications generally act as a substitute for face-to-face interaction, a user may have little interaction with any people associated with the business. Consequently, the user may have very limited options through which to ask questions regarding confusing content or how to proceed through the process required to accomplish the desired function. In addition to inflexibility of the conventional software applications themselves, these problems can lead to a disconnect between the user and the business, which can weaken the business-customer relationship.

Additionally, conventional software applications are inefficient, because they continually require the user to be the principal navigator of the application. Though a user may seek assistance from a customer support representative in interacting with the application, the support representative is generally limited to orally providing instructions to the user. As a result, any rendered assistance fails to alleviate the burden of navigating the application from the user. If the user doesn't understand how to navigate the software application, even after receiving instruction, the resources of the software application (and the underlying device) may be needlessly tied up as the user tries to find the desired information or function.

Prior attempts to improve a user's experience have included tutorial slide shows or videos, help documents, guided tours of the site or application, or other similar attempts to familiarize the user with the offered functionality. These solutions, however, typically do not cover every function offered, overload the user with too much information at once, or offer a predetermined explanation with no elaboration if the user does not understand.

Other solutions, such as telephone support, requires the user to either use multiple devices to follow the representative's instructions while on the phone or to write down or memorize the instructions and perform them after the conversation has ended. This limits a user to seeking support only where multiple devices or writing materials are available. For example, a user may be trying to use a mobile application on their mobile device. Many mobile devices do not allow a user to talk on a phone call and navigate a mobile application at the same time. Thus, a phone call many not be sufficient to resolve the user's concerns.

Users may attempt to perform a video call or text chat session to obtain help with a software application. Again, some devices do not allow for simultaneous video chats and navigation of a software application. Furthermore, even if the devices allow for both, the use of two separate applications (the software application and a video chat application) require switching back and forth between the video call application and the software application, require large amounts of processing power to run both applications, or otherwise lead to a degraded experience.

SUMMARY

One or more embodiments described herein provide benefits and/or solve one or more of the foregoing or other problems in the art with systems, methods, and non-transitory computer readable storage media that improve computer systems by providing workflows to users of client devices via a plurality of channels. For example, in one or more embodiments, a system generates a workflow for a user comprising a plurality of tasks and additionally generates one or more display elements corresponding to the workflow tasks. The system then notifies the user that a first task is pending using a variety of communication channels. For example, the system can send a first notification for the first task via a first communication channel and a second notification via a second communication channel. If the system receives a user selection of one of the notifications from a client device associated with the user, the system can subsequently provide a first display element corresponding to the first task to the client device via the corresponding communication channel. In other words, the system allows a workflow to be completed at a user's will via a number of different channels, thereby, providing increased flexibility.

For example, the channels can comprise email, text, direct messages via a native computing application, website access, and video chat. In one or more embodiments, providing a workflow to a user involves establishing a video connection between a client device of the user and a support terminal while also allowing the support terminal to push display elements through a separate connection to the client device. In particular, establishing a separate connection providing bidirectional capabilities between the client device and support terminal allows the support terminal to push elements directly to the client device while maintaining the video connection. Thus, rather than requiring a user of an application on the client device to navigate the application to find the display elements, the support terminal pushes these elements directly to the client device. In effect, the system enables a support terminal to remotely control the display of such elements on the client device.

More particularly, in some embodiments, when the client device receives the first display element, instructions stored on the client device execute, dividing the display of the client device into at least a first pane and a second pane. The first pane displays a video chat session and the second pane displays the display element. Thus, the user of the client device is able to maintain interpersonal communication with a user of the support terminal while reviewing and/or interacting with the display element/software application. In this way, a user of the software application is spared the hassle of using multiple devices or memorizing instructions when seeking help in navigating and using the application.

The following description sets forth additional features and advantages of one or more embodiments of the disclosed systems, computer readable storage media, and methods. In some cases, such features and advantages will be obvious to a skilled artisan from the description or may be learned by the practice of the disclosed embodiments.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example environment in which a workflow system can operate in one or more embodiments;

FIGS. 5A-5C illustrate an exemplary workflow in accordance with one or more embodiments;

DETAILED DESCRIPTION

Figure 2A:
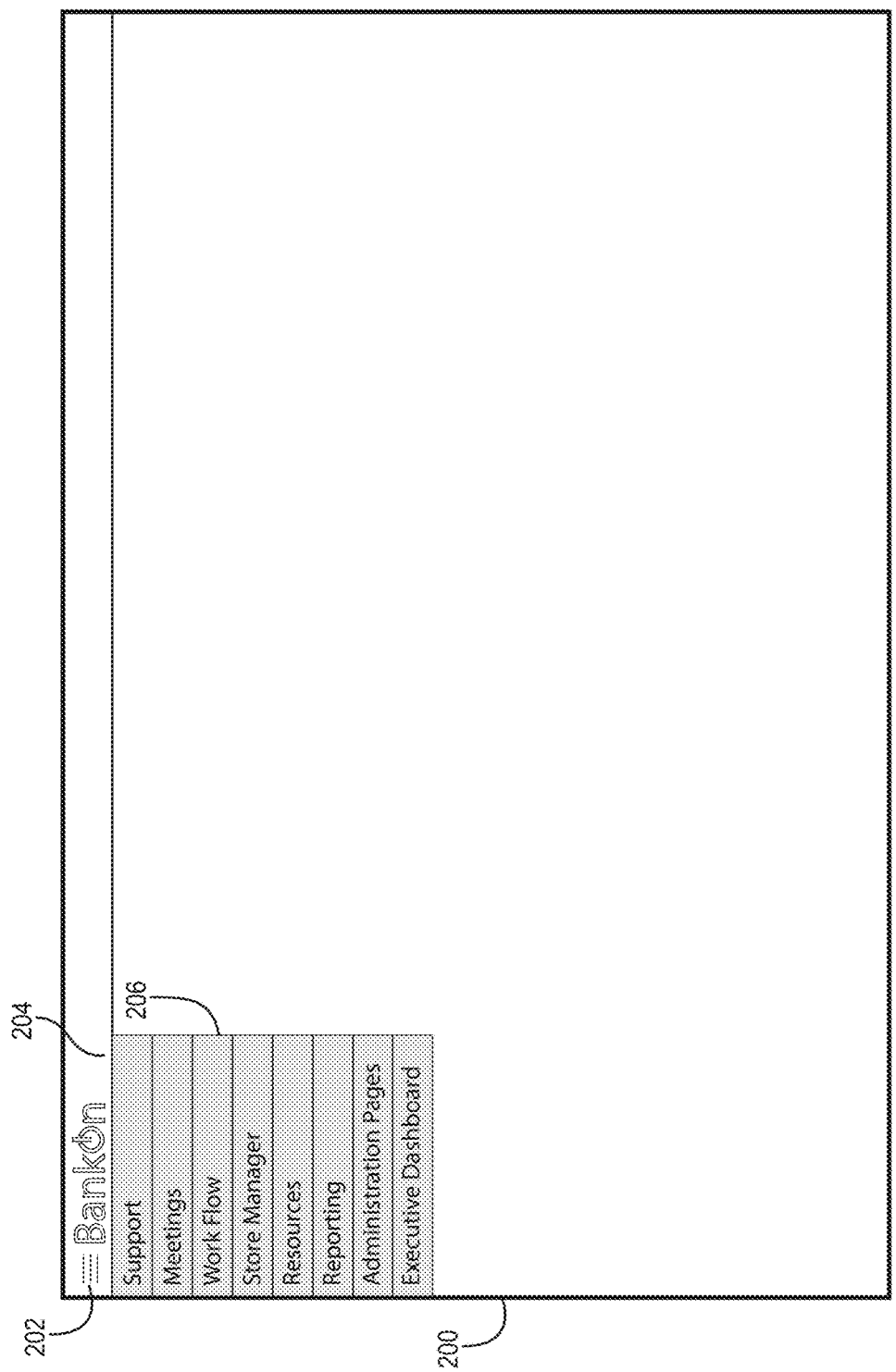
FIGS. 2A-2D illustrate a user interface for generating a workflow to send to a client device in accordance with one or more embodiments.

One or more embodiments described herein include a workflow system that provides workflows to client devices and allows user to flexibly complete tasks of the workflow using any of a plurality of communication channels. To illustrate, the workflow system generates a workflow that includes a plurality of tasks for a user to complete. The workflow additionally generates one or more display elements that correspond to the plurality of tasks. The workflow system then provides a first notification to the user through a first communication channel and a second notification through a second communication channel. In particular, each notification notifies the user of the first task to complete. If the user selects the first notification using a client device, the workflow system provides a first display element corresponding to the first task to the client device through the first communication channel.

As just mentioned, the workflow system generates a workflow including a plurality of tasks as well as one or more corresponding display elements to provide to a user. For example, if a user desires to apply for a loan, the workflow system can generate a workflow that includes all tasks required for the user to apply for the loan. If a loan application requires a user to fill out an application form, provide a signature, and also provide identification, the workflow system can generate a workflow to guide the user through the process. In particular, the workflow system can generate display elements for each task required to assist the user through the loan application (e.g., a first display element to enable the user to fill out the correct form, a second display element enable the user to provide a signature, and a third display element to enable the user to provide a copy of identification).

After generating the workflow and display elements, the workflow system provides notifications to the user regarding the first task of the workflow using various communication channels. In particular, the workflow system provides a first notification via a first communication channel and at least a second notification via a second communication channel. When the user selects a notification, the workflow system provides the first display element corresponding to the first task through the corresponding communication channel. For example, if the user selects the first notification sent through a mobile application, the workflow system can subsequently provide the first display element through the mobile application. In some embodiments, the workflow system provides notifications regarding every task of the workflow using all the communication channels.

In some embodiments, providing a display element involves initiating a video chat between the client device of the user and a support terminal of a support representative. In one or more embodiments, a user can start a video chat session to seek aid to complete a task. In other embodiments, the workflow can be initiated during a video chat. For example, the workflow system can provide a display element for a task includes a selectable option and the workflow system initiates the video chat upon receiving a user selection of the selectable option. The workflow system can maintain the video chat throughout the duration of the user's efforts to complete the workflow or sever the connection through which the video chat was conducted as soon as a particular task is completed.

More particularly, the workflow system initiates a video chat session by establishing a first connection between the client device and the support terminal. Once established, the workflow system conducts a video chat transmitted through the first connection and provides the video chat for display to both the support terminal and the client device. A user of the client device and a support representative using the support terminal may then communicate with one another.

Additionally, one or more embodiments of the workflow system enable the support terminal to push display elements to the client device. For example, in at least one embodiment, the support terminal selects a display element from a set of selectable display elements stored on the support terminal and subsequently pushes the display element to the client device. The workflow system may transmit the display element to the client device through a second connection. For example, the workflow system uses a second connection, separate from the first connection to send the display element. One will appreciate in light of the disclosure herein that the use of a separate connection allows the support terminal to push the display element, uses less computing resources, and avoids degrading the video chat.

In one or more embodiments, the workflow system provides instructions to the client device along with the first display element to divide the display of the client device into multiple panes (e.g., two or more panes). In at least one embodiment, the client device divides the display into at least a first pane and a second pane. The workflow system then provides the video chat in the first pane while concurrently providing the display element in the second pane.

By concurrently providing a video chat and a display element, the workflow system enables a support representative to more effectively guide a user of a client device through the entire process of interacting with a software application. In this way, the user avoids navigating an unfamiliar software application and, as a result, avoids possible frustration. Additionally, by using a connection that provides bidirectional communication, the support terminal provides the information or function directly to the client device. Bidirectional communication gives the workflow system advantages over conventional systems in which a client device polls a server for data. In such traditional systems, a server may not initiate communication with a client device but may only respond to a request. Using a bidirectional connection, the workflow system allows the support terminal to immediately provide an available display element to the client device, rather than wait for a request. Thus, one or more embodiments provide for quicker processing/sending of display elements to a client device.

Further, the client device displays the video chat and the display element concurrently using the same software application, and thus, requires fewer computer resources than a conventional system—such as memory, processing power, and display space—thus allowing a limited set of computer resources to perform functions faster than before. In particular, a user need not have a separate video chat application running together with the software application.

Additionally, the workflow system can employ the user of web sockets to communicate independent actions of the user in real-time. This can allow the workflow system to track the status of each task or action in real time despite the various communication channels that may be being employed to complete the various tasks. Thus, the workflow system can help provide accurate, real time status and tracking despite a more complex architecture with multiple simultaneously usable communication channels.

As illustrated by the foregoing discussion, the present disclosure uses a variety of terms to describe features and benefits of the workflow system. Additional detail is now provided regarding the meaning of these terms. For example, as used herein, the term "workflow" refers to a plurality of tasks. In particular, a workflow can include a sequence of tasks to be completed to accomplish an objective. For example, a workflow can include a series of tasks required in applying for a bank loan (e.g., filling out a form, signing the form, and providing identification), applying for a license, or completing a school assignment.

As used herein, the term "task" refers to an action to be performed by a user. For example, a task can include providing a signature, taking a picture, providing contact information, or responding to a question (e.g., a multiple choice or free response question).

Further, as used herein, the term "display element" refers to a visualization of data and/or interactive elements displayable on a user interface. In particular, a display element includes a visual means for performing a task displayable on a user interface. For example, a display element can include a signature pad, a video, a Tillable digital form, a selectable option for accepting terms, a document, or an informational slide. A display element can further include an interactive button enabling a user to submit that a corresponding task has been completed.

Additionally, as used herein, the term "communication channel" refers to electronic communication. In particular, a communication channel includes a mode of distributing electronic communications from one electronic device to one or more other electronic devices. For example, a communication channel can include using instant messaging, SMS or MMS messaging, email, video chat, or applications stored on or accessed by an electronic device to distributing an electronic communication to one or more client devices.

Though the discussion herein includes implementations of the methods and systems in the context of a banking software application, it will be appreciated that this context is merely illustrative and that the uses of the methods and systems described extend beyond a banking application to other non-banking software applications. Further, though the methods and systems are generally discussed with reference to a user interacting with the workflow system using a mobile device, it will be appreciated that the systems and methods are equally effective for users using other types of client devices.

Referring now to the figures, FIG. 1 illustrates a schematic diagram of an environment 100 in which the workflow system 104 operates. As illustrated in FIG. 1, the environment 100 can include a server(s) 102, a database 106, WebSocket servers 108-112, a support terminal 114 associated with a support representative 116, a network 118, client devices 120a-120b associated with users 122a-122b, and a peer-to-peer connection 126. Although the environment 100 of FIG. 1 is depicted as having a particular number of components, the environment 100 can have any number of additional or alternative components (e.g., any number of servers, client devices, databases, or other components in communication with the workflow system 104). Similarly, although FIG. 1 illustrates a particular arrangement of the server(s) 102, the database 106, the WebSocket servers 108-112, the support terminal 114, the support representative 116, the network 118, the client devices 120a-120b, and the users 122a-122b, various additional arrangements are possible.

Figure 15:
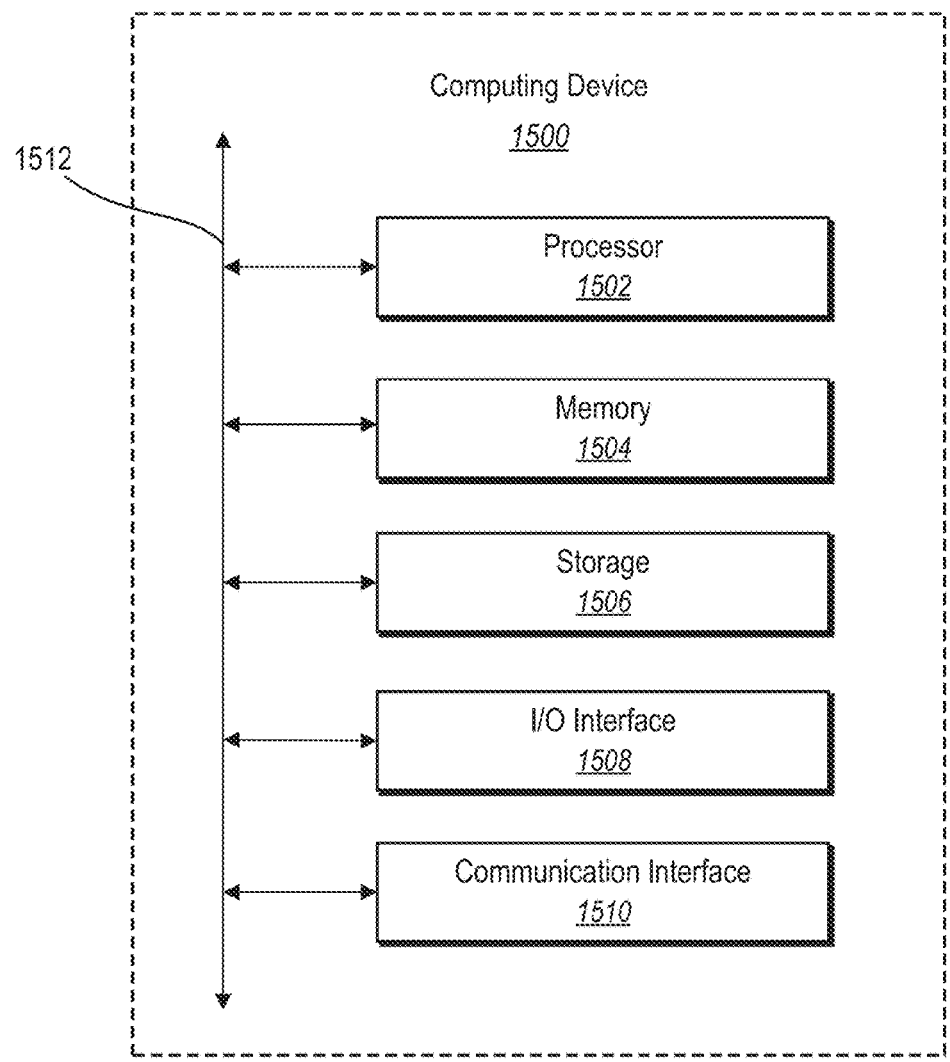
FIG. 15 illustrates a block diagram of an exemplary computing device in accordance with one or more embodiments.

The server(s) 102, the WebSocket servers 108-112, the support terminal 114, and the client devices 120a-120b may be communicatively coupled with each other either directly or indirectly (e.g., through the network 118, networks are discussed in greater detail below in relation to FIG. 15). Moreover, the server(s) 102, the WebSocket servers 108-112, the support terminal 114, and the client devices 120a-120b may include any type of computing device (including one or more computing devices as discussed in greater detail below in relation to FIG. 15).

As mentioned above, the environment 100 includes the server(s) 102. The server(s) 102 can generate, store, receive, and/or transmit data, including a workflow, a display element, data resulting from a user interaction with a display element, video data, or a video chat request. For example, the server(s) 102 can transmit a notification regarding a first task of a workflow to the client device 120a. In particular, the server(s) 102 can utilize a push token to send a notification to a native application (e.g., workflow application 124) on a client device 120a, 120b. Alternatively or additionally, the server(s) 102 can send an email as the notification with a link to a web-based workflow application. Upon receiving a user selection of the notification from the client device 120a, the server(s) 102 can provide a display element corresponding to the first task to the client device 120a. In one or more embodiments, the server(s) 102 can comprise a data server. The server(s) 102 can also comprise a communication server or a web-hosting server.

In one or more embodiments, the server(s) 102 establishes a connection between the support terminal 114 and a client device (e.g., the client device 120a). For example, the server(s) 102 can establish a connection in response to a video chat request sent by the client device 120a. In particular, the server(s) 102 establishes the connection to allow transmission of a video chat between the support terminal 114 and the client device 120a. For example, once the server(s) 102 establishes a connection, the server(s) 102 conducts a video chat between the support terminal 114 and the client device 120a through that connection. The support representative 116 and the user 122a can interact with the support terminal 114 and the client device 120a respectively to communicate with one another via the video chat.

As illustrated, in one or more embodiments, the server(s) 102 comprises one server. Alternatively, the server(s) 102 may comprise a series of servers. For example, the server(s) 102 can comprise a video load balance server, a signaling server, and a STUN/TURN server. The video load balance server serves to direct communications to an available support terminal, the signaling server notifies the available support terminal of a video chat request, and the STUN/TURN server serves to work through secure firewalls to establish the connection. Alternatively, any other combinations and types of servers sufficient to establish a connection may be used as part of the server(s) 102.

Additionally, the server(s) 102 can execute or implement the workflow system 104. In one or more embodiments, the workflow system 104 uses the server(s) 102 to provide a workflow to one or more client devices (e.g., the client devices 120a-120b). To illustrate, the server(s) 102 can generate a workflow comprising a plurality of tasks and additionally generate one or more display elements corresponding to the plurality of tasks. The server(s) 102 can then provide a first notification of a first task to the user 122a via a first communication channel (e.g., through the WebSocket server 108) and also provide a second notification of the first task to the user 122a via a second communication channel (e.g., through the WebSocket server 110). If the server(s) 102 receives a user selection of the first notification from the client device 120a, then the server(s) 102 provides a first display element corresponding to the first task to the client device 120a. Additionally, the server(s) 102 can provide a third notification of a second task to the user 122b via a third communication channel (e.g., through an additional WebSocket server that is not shown). If the server(s) 102 receives a user selection of the third notification from the client device 120b, the server(s) 102 can then provide a second display element corresponding to the second task to the client device 120b. In one or more embodiments, upon receiving a user selection of a notification from a client device, the server(s) 102 can establish a video chat between the client device and the support terminal 114.

The workflow system 104 can be implemented in whole, or in part, by the individual elements of the environment 100. Although FIG. 1 illustrates the workflow system 104 being implemented by the server(s) 102, it will be appreciated that one or more components of the workflow system 104 can be implemented in any of the components of the environment 100, such as the client devices 120a-120b. The components of the workflow system 104 will be discussed in more detail with regard to FIG. 12 below.

As shown in FIG. 1, the environment 100 can also include the database 106. In one or more embodiments, the database 106 stores information used by the server(s) 102 and/or the support terminal 114 when connected to one of the client devices 120a-120b. To illustrate, the database 106 can store the workflows and display elements generated by the server(s) 102. The support terminal 114 can then access the database 106 (e.g., via the server(s) 102)) to retrieve display elements to push to one of the client devices 120a-120b. Additionally, or alternatively, one of the client devices 120a-120b can transmit a modified display element (i.e., a display element with which a user has interacted) to the server(s) 102, which stores the display element in the database 106. If the client device is in communication with the support terminal 114, the support terminal 114 can then retrieve the modified display element from the database 106.

As is also illustrated in FIG. 1, the environment 100 can also include the WebSocket servers 108-112. The WebSocket servers 108-112 can generate, store, receive, and transmit various types of data, including a display element (not shown). In particular, the WebSocket servers 108-112 provide a bidirectional connection, also known as a full-duplex connection, enabling the server(s) 102 and/or the support terminal 114 to push data to the client devices 120a-120b, rather than requiring the server(s) 102 or the support terminal 114 to wait for a request from one of the client devices 120a-120b, as is done in some traditional client/server systems. For example, the WebSocket server 108 can receive and push a display element sent from the server(s) 102 to the client device 120a. Though FIG. 1 illustrates an embodiment where a connection between the server(s) 102 and the client devices 120a-120b or between the support terminal 114 and one of the client devices 120a-120b is established through one of the WebSocket servers 108-112, it will be appreciated that any type of server or device that enables the server(s) 102 or the support terminal 114 to push a display element to one of the client devices 120a-120b can be used as a substitute for any of the WebSocket servers 108-112.

The WebSocket servers 108-112 can communicate with the workflow system 104 and the workflow application 124 in real-time. For example, the WebSocket servers 108-112 can communicate, in real-time, a signature, and its required perquisite tasks, on a proprietary document utilized by the organization utilizing the service. As another example, the WebSocket servers 108-112 can communicate, in real-time, document approval on a final document that is proprietary to the organization that is utilizing the service. Still further, the WebSocket servers 108-112 can communicate, in real-time, uploading of a document to the institution that could be used to begin or activate a service offered through the service delivery organization.

As shown in FIG. 1, the environment 100 also includes the support terminal 114. The support terminal 114 may comprise a computing device, such as those described below in relation to FIG. 15 For example, the support terminal 114 may comprise one or more personal computers, laptop computers, mobile devices, mobile phones, tablets, special purpose computers, televisions, or other computing devices. The support terminal 114 can include one or more applications (e.g., the workflow creation/request application 128) that allows the support representative 116 to send and receive display elements and communicate with a user of a client device (e.g., one of the client devices 120a-120b). For example, the workflow creation/request application 128 can include a software application installed on the support terminal 114. Additionally, or alternatively, the workflow creation/request application 128 can include a software application hosted on the server(s) 102, which can be accessed by the support terminal 114 through another application, such as a web browser.

In one or more embodiments, the client devices 120a-120b include client devices that allow users of the devices (e.g., the users 122a-122b) to receive and interact with display elements. For example, the client devices 120a-120b can include smartphones, tablets, desktops, computers, laptop computers, or other electronic devices. The client devices 120a-120b can include one or more applications (e.g., the workflow application 124) that allows the users 122a-122b to receive and interact with display elements. In one or more embodiments, the workflow application 124 accessible to the client devices 120a-120b is different than that accessible to the support terminal 114. For example, the client devices 120a-120b can access a client version of the workflow application 124 while the support terminal 114 accesses a support version.

As shown in FIG. 1, the support terminal 114 can communicate with the client device 120a through the server(s) 102, the WebSocket server 112, and/or the peer-to-peer connection 126. For example, the support terminal 114 can communicate with the client device 120a using two or more channels of communication. To illustrate, the support terminal 114 can conduct a video chat with the client device 120a through the server(s) 102 or the peer-to-peer connection 126 while concurrently pushing display elements to the client device 120a through the WebSocket server 112.

In particular, the peer-to-peer connection 126 serves as a direct connection between the support terminal 114 and the client device 120a (or the client device 120b, which connection is not shown). In one or more embodiments, the peer-to-peer connection 126 can serve to substitute the server(s) 102. For example, after the server(s) 102 establishes the connection between the support terminal 114 and the client device 120a, the support terminal 114 can subsequently establish the peer-to-peer connection 126 and conduct the video chat over that connection. As used herein, a peer-to-peer (P2P) connection is created when two or more client computing devices are connected and share resources without going through a separate server computing device (e.g., the server(s) 102). The peer-to-peer connection 126 can provide a solution to bandwidth limitations that restrict the maximum number of concurrent video streams possible through the server(s) 102. The peer-to-peer connections, where possible, maximize the number of possible simultaneous video calls.

In one or more embodiments, the server(s) 102 may first determine if the peer-to-peer connection 126 is available. For example, the peer-to-peer connection 126 may be unavailable due to limitations or the configuration of the hardware or software within the environment 100. For example, video relays between client devices on restrictive networks and firewalls are often blocked. Network address translation limits the client device's ability to have peer-to-peer connections. In one or more embodiments, the server(s) 102 detects when a peer-to-peer connection is not possible. If the server(s) 102 determines that the peer-to-peer connection 126 is not available, then the server(s) 102 may maintain (or reroute) the connection for the video chat. In an alternative embodiment, the server(s) 102 may maintain the connection with a client device whether or not the peer-to-peer connection 126 is available.

As mentioned above, the workflow system 104 can use the server(s) 102 to generate a workflow and one or more display elements corresponding to tasks required by the workflow and send the display elements to a client device of a user. In one or more embodiments, the workflow system 104 generates the workflow and display elements in response to direction provided by a backend operator of the system, such as a support representative. For example, the support representative 116 can use the support terminal 114 to instruct the workflow system 104 as to the type of workflow and display elements to make. FIGS. 2A-2D illustrate a user interface for generating a workflow and corresponding display elements to send to the client device of a user in accordance with one or more embodiments.

For example, FIG. 2A illustrates an example embodiment of a user interface 200 for generating a workflow. In particular, the user interface 200 can represent an interface presented to the support representative upon accessing the workflow system. As shown in FIG. 2A, the user interface 200 comprises a menu select option 202. Upon detecting selection of the menu select option 202, the user interface 200 displays the menu 204 comprising a plurality of selectable options, including the workflow option 206.

Figure 2B:
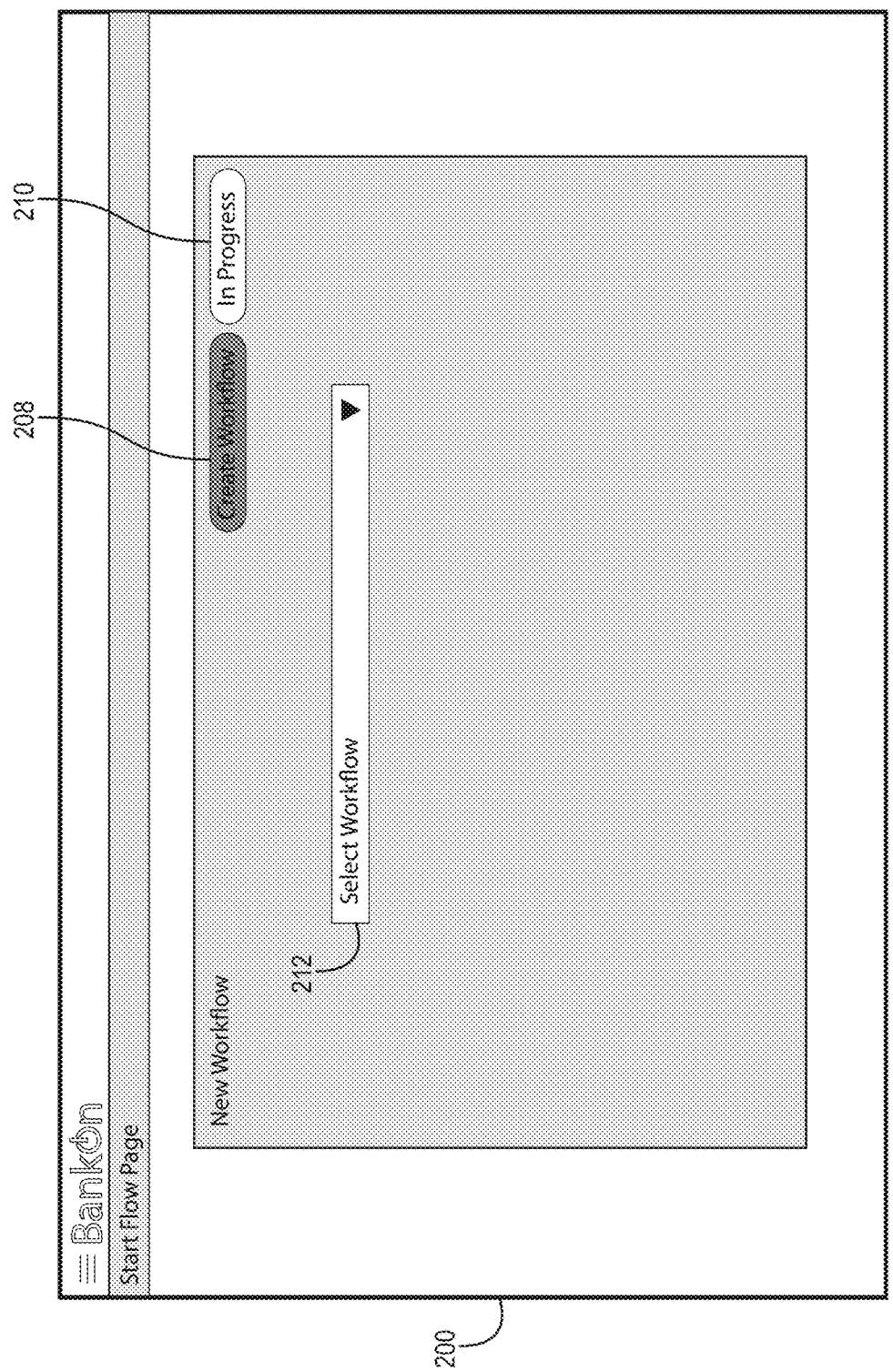

FIG. 2B illustrates the user interface 200 after the support representative has selected the workflow option 206 in accordance with one or more embodiments. In particular, the user interface 200 displays a create workflow option 208 and an in progress option 210. When the create workflow option 208 is selected, the user interface 200 enables the support representative to instruct the workflow system 104 in generating a new workflow. In particular, when the create workflow option 208 is selected, the user interface 200 displays a dropdown menu 212 whereby the support representative can select the type of workflow to create. In contrast, the in progress option 210 enables the support representative to view information and select further options regarding one or more workflows that have already been generated and sent to client devices.

Figure 2C:
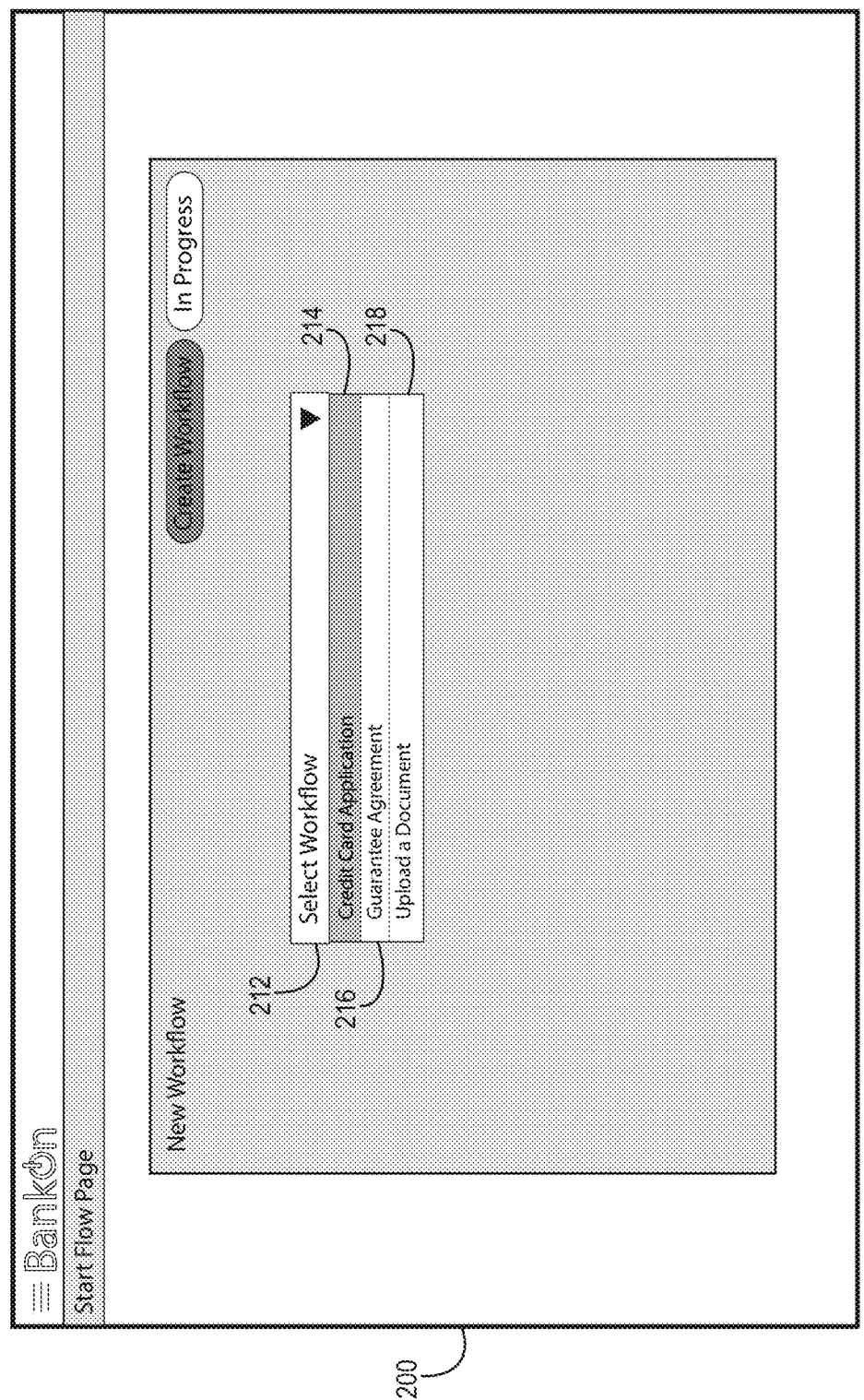

FIG. 2C illustrates the user interface 200 after the support representative has selected the dropdown menu 212. FIG. 2C illustrates the dropdown menu 212 including a credit card application option 214, a guarantee agreement option 216, and a document upload option 218. In one or more embodiments, each option provided in the dropdown menu 212 corresponds to a workflow template stored by the workflow system 104. Upon detecting a selection of one of the options 214-218, the workflow system 104 provides the support representative with the corresponding workflow template, which the support representative can subsequently customize before sending to the client device.

Figure 2D:
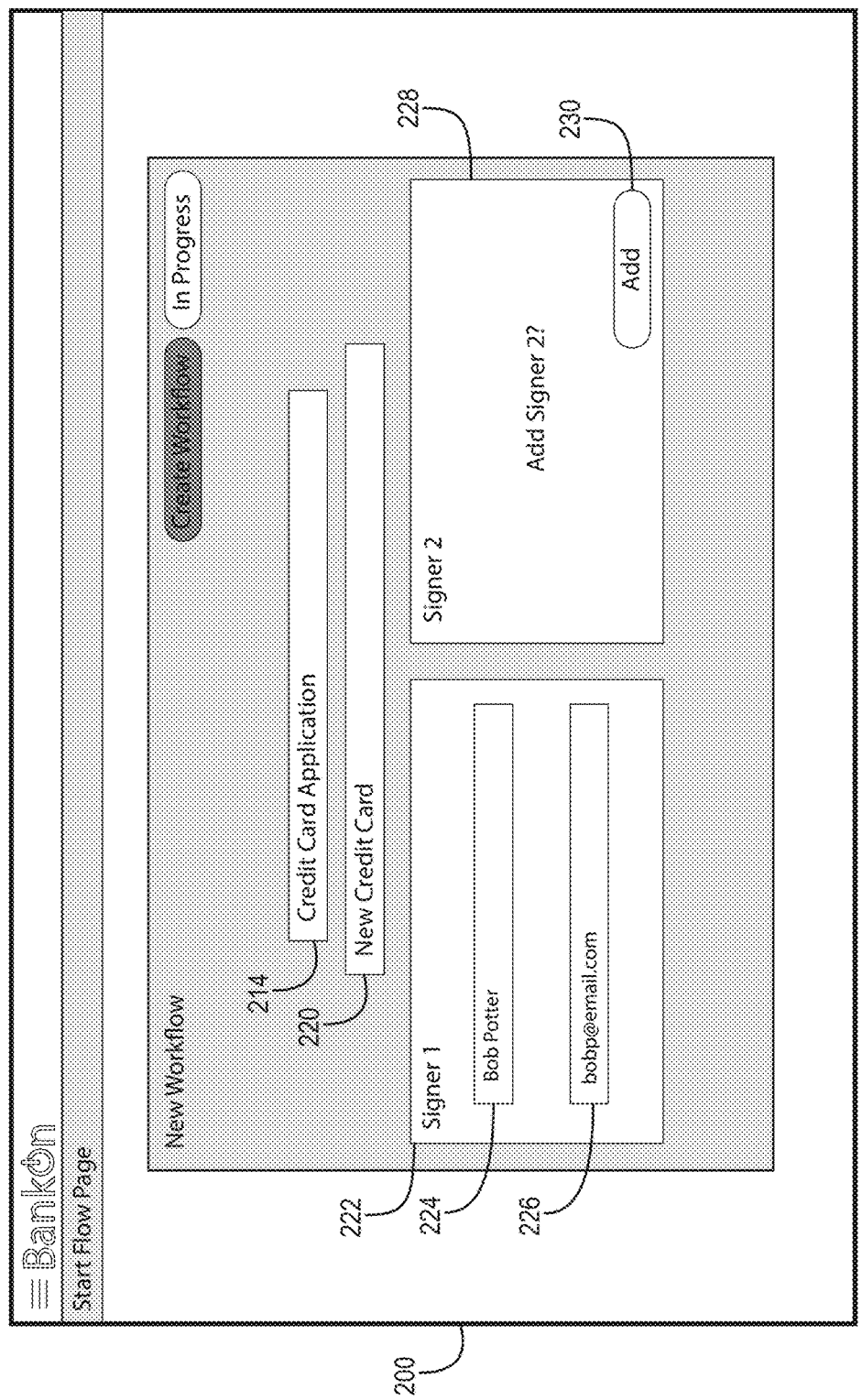

FIG. 2D illustrates the user interface 200 after the support representative has selected the credit card application option 214 of the dropdown menu 212 in accordance with one or more embodiments. As shown in FIG. 2D, after selection of the credit card application option 214, the user interface 200 displays a workflow title field 220, a first user entry space 222, and a second user entry space 228. The workflow title field 220 enables the support representative to enter a custom title for the workflow. The user entry spaces enable the support representative to enter information for the users to which the workflow system 104 will send the workflow (or certain tasks/display elements from the workflow). As shown in FIG. 2D, the first user entry space 222 includes a name field 224 and a contact information field 226 whereby the support representative can enter the name and contact information (e.g., email address, phone number, etc.) of the first user. The second user entry space 228 provides an add option 230 by which the support representative can add a second user to which the workflow system 104 will send the workflow. Upon receiving a selection of the add option 230, the user interface provides fields enabling the support representative to add information for the second user. In one or more embodiments, the user interface 200 provides options by which the support representative can add further users to the workflow.

As shown by FIG. 2D, a support representative can use a support portal (e.g., the server supported user interface 200) to start a workflow. The workflow system can allow the use of an anonymous person's email to stage account creation for the purpose of completing tasks and assignments within a specific multi-channel workflow service, as shown by FIG. 2D. In such embodiments, the new user can be required to create a login and authenticate before they are able to complete a workflow task that has been assigned. Alternatively, the workflow system can allow the use of an authenticated user token (associated with an existing account) to initiate the workflow for the user of the existing account. In such embodiments, the workflow system can provide, via the user interface 200, a list of potential participants from which a support representative can select users. Still further, the workflow system can allow the use of an anonymous person's email and authenticated user tokens (e.g., the system can allow for a combination when creating a workflow involving multiple users). In workflows with multiple users assigned tasks, the workflow system can allow a user can allow a user to interact with the system uniquely and independently of other participants. In such embodiments, the workflow system can allow a user interacting uniquely through the workflow with a video agent, to complete the assigned tasks and have them continue to be assigned to other parties of the workflow while the native video connection continues to run.

Furthermore, in one or more embodiments, the workflow system can allow a service representative or another employee of the service organization to be assigned tasks from the workflow. For example, the workflow system can assign a manager to approve a loan, sign a document, verify information, etc. In still further embodiments, the workflow system can require all finalized documents to be accepted by the service representative or other employee of the service organization. In alternative embodiments, the workflow system can require all finalized document to be accepted by a primary user.

Figure 3:
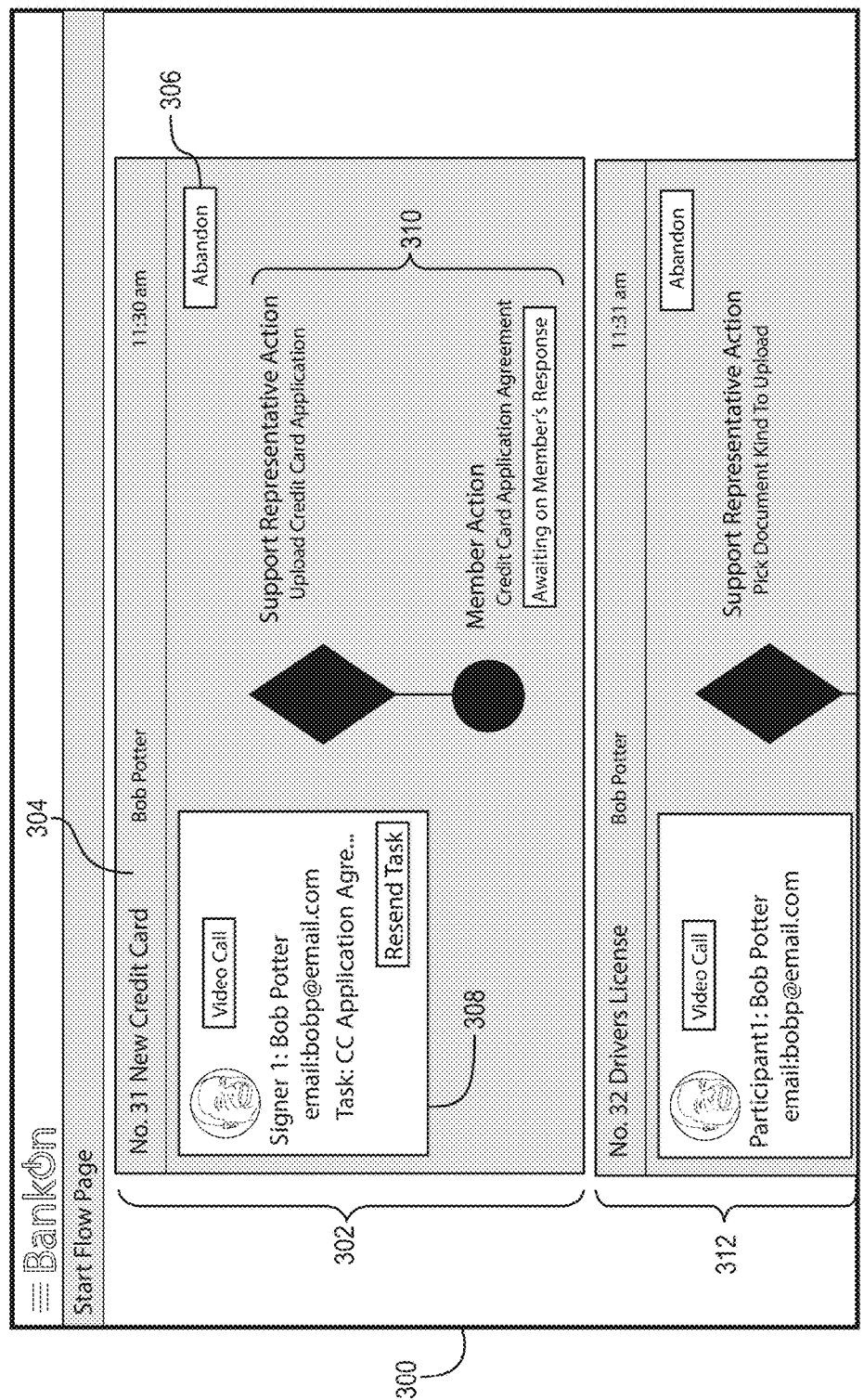
FIG. 3 illustrates a user interface for displaying workflow information regarding one or more existing workflows in accordance with one or more embodiments.

As mentioned above, the user interface 200 can provide the in progress option 210 by which a support representative can view information and select further options regarding one or more workflows that have already been generated and sent to client devices. FIG. 3 illustrates a session user interface 300 used in one or more embodiments for displaying workflow information regarding one or more existing workflows. In one or more embodiments, the session user interface 300 displays information corresponding to pending (i.e., incomplete) workflows. Additionally, the user interface 300 can display information corresponding to completed workflows.

As shown in FIG. 3, the session user interface 300 provides a first workflow display 302 and a second workflow display 312. Each workflow display provides information and options regarding a particular workflow. For example, the first workflow display 302 includes a workflow identification bar 304, an abandon option 306, a user display 308, and a status flow 310. The workflow identification bar 304 provides information identifying the particular workflow (e.g., title and identification number). The abandon option 306 enables a user to abandon (i.e., cancel) the workflow or, alternatively, the current task. The user display 308 provides information regarding the user to which the workflow has been sent (e.g., user name, contact information, and the user's current task) as well as options configured to aid in the progression of the workflow (e.g., initiating a video chat with the user or resending a notification of the current task to the user). The status flow 310 provides the current status of the workflow. In particular, the status flow 310 displays previous workflow tasks that have been completed as well as the current, pending task.

In one or more embodiments, after generating a workflow and display elements corresponding to tasks required by the workflow, the workflow system 104 provides notifications regarding the tasks to a user. For example, the workflow system 104 can provide a notification of the first task required by the workflow. In some embodiments, the workflow system 104 provides a notification for each subsequent task as well. In one or more embodiments, the workflow system 104 provides multiple notifications of each task to the user through various communication channels. For example, the workflow system 104 can provide a first notification of the first task to the user through a first communication channel and a second notification of the first task through a second communication channel.

In one or more embodiments, the workflow requires tasks to be performed by multiple users. For example, the workflow can require that a first user perform a first task and that a second user perform a second task. Consequently, the workflow system 104 can additionally provide a notification for the second task to the second user. In one or embodiments, the workflow system 104 provides the notification for the second task through a third communication channel (i.e., different from the first and second communication channels).

Furthermore, the can monitor the activity of a user assigned a task. If the user enters into a state of inactivity (e.g., has not responded to the task by a threshold amount of time), the workflow system can automatically (e.g., without service representative input), push a notification to the user to remind the user to complete the generated task. The workflow system can provide the notification via one of the channels or all of the channels.

Additionally, the workflow system can require all user to be completed in the order they were identified within the workflow. Requiring the tasks to be complete in a direct order can help ensure business processes and functions are created and completed at the appropriate time. Alternatively, the workflow system can allow for the creation of parallel tasks, enabling a function that allows multiple signers to sign or perform another task at the same time.

The session user interface 300 can include all user information within the workflow. For example, the session user interface 300 can provide historical document data and proof of signatures and consents given thereof. Furthermore, the session user interface 300 can see each task as it is created and completed by the user. The user of the web socket servers described above can provide the real-time updates that are surfaced via the session user interface 300.

Figure 4A:
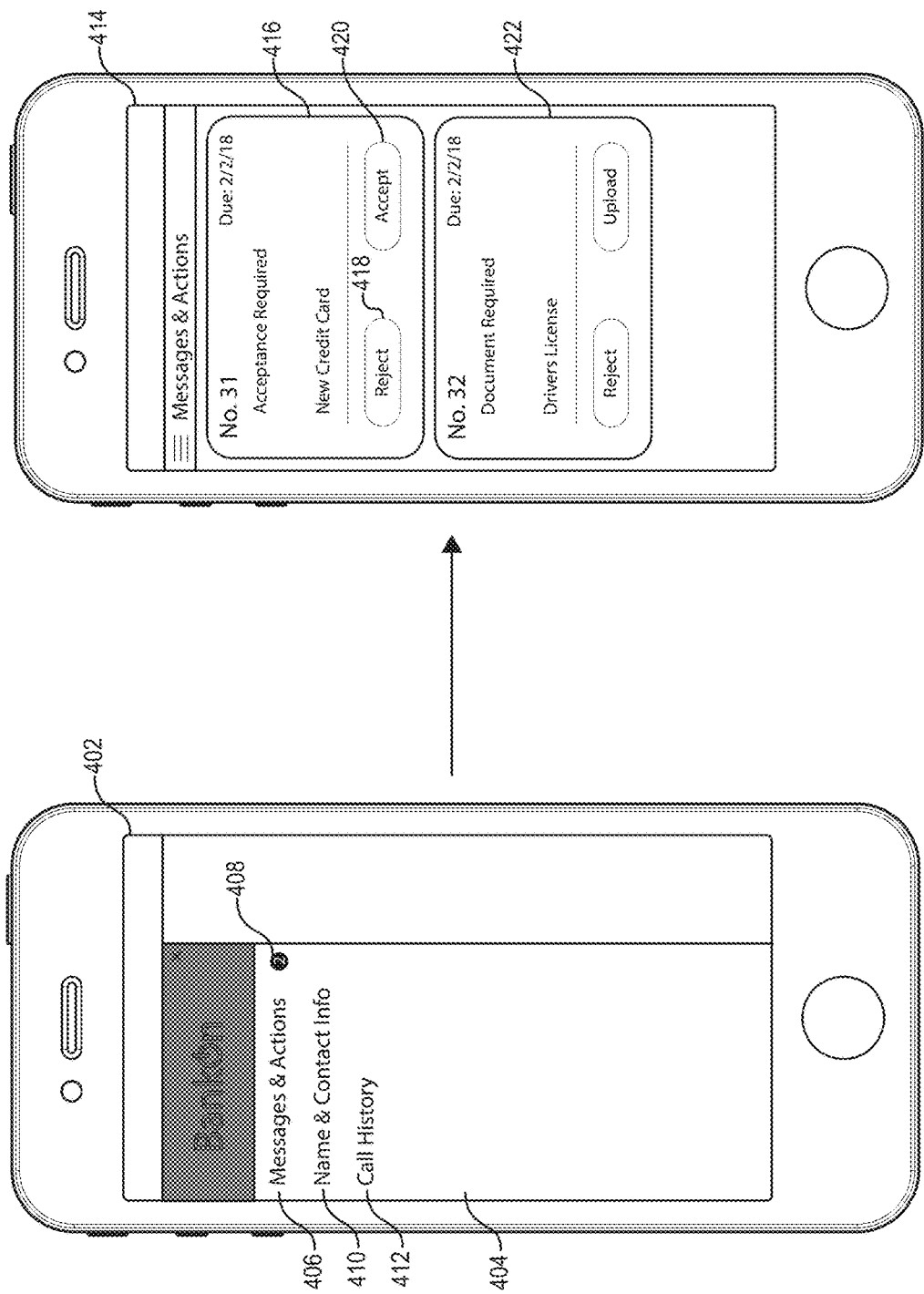
FIGS. 4A-4B illustrate exemplary notifications provided by the workflow system in accordance with one or more embodiments.
Figure 4B:
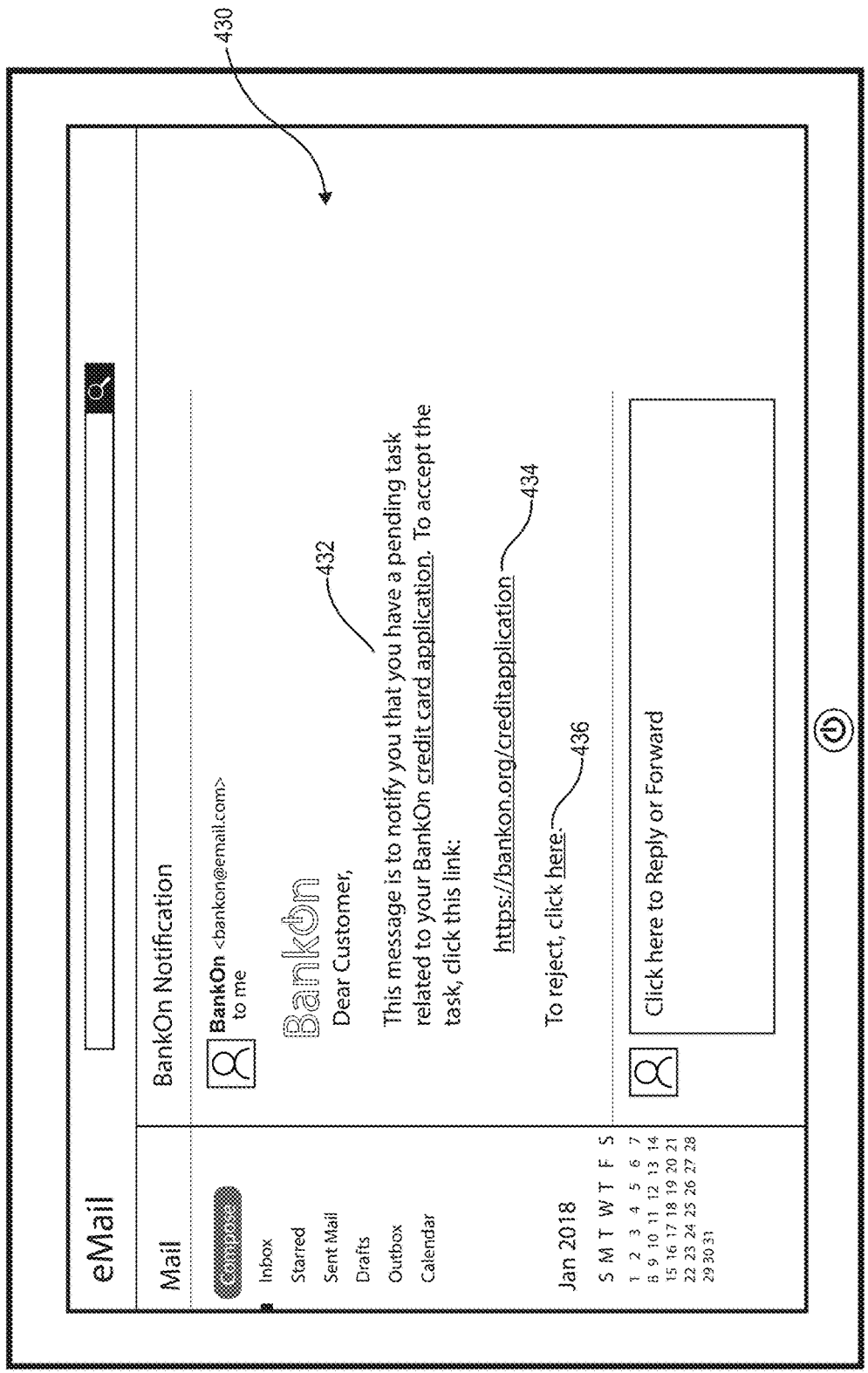

FIGS. 4A-4B illustrate exemplary notifications provided by the workflow system 104 through various communication channels in accordance with one or more embodiments. For example, FIG. 4A illustrates an exemplary notification of a task sent to a user via a first communication channel. In particular, FIG. 4A illustrates the notification sent to a mobile application (e.g., the workflow application 124) installed on a mobile device of the user. Though FIG. 4A illustrates the workflow application 124 as a mobile application being accessed through a mobile device, it will be appreciated that the application can be installed on and accessed through any type of client device. As shown in FIG. 4A, when accessed, the workflow application 124 displays an application interface 402 that provides various selectable options, including a menu option (not shown). When the user selects the menu option, the application interface 402 displays the menu interface 404, which provides various links through which the user can access further information. For example, the menu interface 404 includes a messages and actions link 406, a name and contact information link 410, and a call history link 412. As can be seen in FIG. 4A, the messages and actions link 406 is accompanied by a notification bubble 408 indicating that there are two notifications for the user.

Upon selection of the messages and actions link 406, the workflow application 124 displays the messages and actions interface 414. In particular, the messages and actions interface 414 shown in FIG. 4A displays a first notification 416 corresponding to a first workflow and a second notification 422 corresponding to a second workflow. Each notification provides information regarding the corresponding workflow, including the current task that is required of the user. For example, the first notification 416 corresponds to a workflow for a new credit card application and indicates that the user is required to accept the workflow.

Additionally, each notification provides one or more selectable options enabling the user to select an action to take regarding the notification. For example, the first notification 416 includes a reject option 418 and an accept option 420. In particular, the reject option 418 enables the user to reject the particular task indicated by the first notification 416. In one or more embodiments, when the user selects the reject option 418, the workflow system 104 receives an update indicating the rejection of the task by the user. Subsequently, the workflow system 104 can reassign the task to another user participating in the workflow (i.e., the second user added to the workflow via the second user entry space 228 discussed with reference to FIG. 2). The workflow system 104 can then send a notification of the task to the other user. In one or more embodiments, the reject option 418 enables the user to reject the entire workflow and, upon receiving an update indicating the rejection, the workflow system 104 cancels the workflow.

The accept option 420 enables the user to accept the task indicated by the first notification 416. When a user selects the accept option 420, the workflow system 104 receives an indication of the user selection. In particular, the workflow system 104 receives the user selection through the same communication channel through which it provided the notification. In response, the workflow system 104 provides a display element corresponding to the task to the user as will be discussed in more detail with regard to FIGS. 5A-5C. In one or more embodiments, the workflow system 104 provides the display element to the user via the same communication channel through which the notification of the task was provided. For example, if the user accepts the task via the application interface 402 (e.g., by selecting the accept option 420), the workflow system 104 provides the display element corresponding to the task via the application.

In one or more embodiments, the user can accept the task indicated by the first notification 416 by selecting the notification itself (rather than selecting the accept option 420). In further embodiments, the workflow system 104 provides a push notification to the client device through the communication channel, and the user can accept the task by selecting the push notification. For example, when sending a notification regarding a task to a user through a mobile application installed on a mobile device of the user, the workflow system 104 can provide a push notification to the mobile device. Upon receiving a user selection of the push notification, the workflow system 104 can provide the display element corresponding to the indicated task through the mobile application. In some embodiments, the workflow system 104 establishes an expiration period and, if the user does not actively accept or reject the task indicated in the notification by the expiration period, the workflow system 104 automatically determines that the task (or the entire workflow) has been rejected.

FIG. 4B illustrates an exemplary notification sent to a user via a second communication channel. In particular, FIG. 4B illustrates the notification sent to the user as a notification email 430 to an email address corresponding to the user. Though FIG. 4B illustrates the notification email 430 being accessed through a desktop computer, it will be appreciated that the notification email 430 can be accessed using any client device having access to an email account.

As shown, the notification email 430 includes a notification message 432 providing information regarding the task required by the workflow. Additionally, the notification email 430 includes an acceptance link 434. In one or more embodiments, upon receiving a selection of the acceptance link 434, the workflow system 104 provides the display element corresponding to the task via the same communication channel through which the notification was provided. For example, the workflow system 104 can provide a copy of the display element to the client device used to accept the task. Additionally, or alternatively, the workflow system 104 provides a web page containing the display element to the client device. In some embodiments, upon selection of the acceptance link 434, the workflow system 104 automatically opens the workflow application 124 (if accessible to the client device) and provides the display element through the application. As seen in FIG. 4B, the notification email 430 also includes a rejection link 436 whereby a user can reject the task or the entire workflow.

Though FIGS. 4A-4B illustrate the workflow system 104 providing two notifications regarding a task through two different communication channels, it will be appreciated that the workflow system 104 can provide notifications through additional or alternative communication channels. For example, the workflow system 104 can provide a notification of a task to the user via a SMS or MMS message, an instant message, or a social media post. When the user selects the notification, the workflow system 104 can provide the display element corresponding to the indicated task via the respective communication channel. In some embodiments, if the client device used to select the notification has access to the workflow application 124, the workflow system 104 can provide the display element through the workflow application.

Figure 5C:
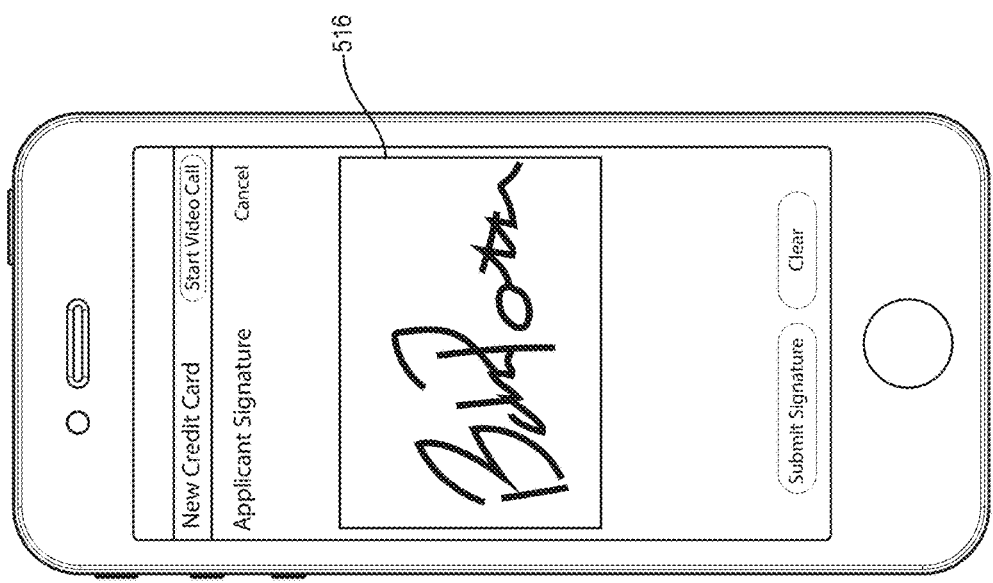

FIGS. 5A-5C illustrate a set of display elements corresponding to tasks required by a workflow provided to a client device by the workflow system 104 in accordance with one or more embodiments. In particular, the set of display elements corresponds to a credit card application. As mentioned above, when a user selects a notification regarding a task, the workflow system 104 provides a display element corresponding to the task to the client device of the user. In one or more embodiments, the user completes the task by modifying the display element. For example, the display element may require the user to enter electronic data (e.g., photo, text, etc.). When the user completes the task, the workflow system 104 receives an update indicating the completion. In response, the workflow system 104 can provide another display element corresponding to the next task required by the workflow. In this manner, the workflow system 104 can provide an entire workflow to the client, enabling the user to complete every required task.

As shown in FIG. 5A, the set of display elements includes a first display element 502. The first display element 502 corresponds to a first task of the workflow. As mentioned above, the workflow system 104 can provide the first display element 502 to the client device of a user after receiving, from the client device, a user selection of a notification for the first task. As seen in FIG. 5A, the first display element 502 includes a fillable digital form 504 whereby the user can enter information required for the credit card application. In addition, the first display element 502 includes an accept option 506 configured to accept and submit the fillable digital form, a reject option 508 configured to reject the task corresponding to the first display element 502, and the cancel option 510 configured to exit the workflow without rejecting the first display element 502. Consequently, the user can return to the workflow at a later time to complete the required tasks.

Further, the first display element 502 includes a video chat option 512. Upon selection of the video chat option 512, the workflow system 104 can initiate a video chat between the client device and a support terminal as discussed below with reference to FIGS. 8-9, enabling the user to communicate with a support representative and receive assistance regarding the current task. In one or more embodiments, the workflow system 104 provides instructions, causing the client device to display the first display element and the video chat concurrently, as will be discussed in more detail below with regards to FIGS. 10A-10F. In some embodiments, the workflow system 104 automatically initiates the video chat between the client device and the support terminal when providing the first display element to the client device.

In some embodiments, after initiating the video chat between the client device and the support terminal, the workflow system 104 transfers control of the workflow to the support terminal. Consequently, the support representative associated with the support terminal can use the workflow application stored on the support terminal to push display elements subsequent to the first display element 502 to the client device at the appropriate time. Additionally, the support representative can receive modified display elements corresponding to completed tasks to personally verify that the tasks were completed correctly. In some embodiments, however, the workflow system 104 maintains control over the workflow and automatically provides the client device with the appropriate display elements.

As shown in FIGS. 5B-5C, the set of display elements also includes a second display element 514 and a third display element 516. In particular, the second display element 514 corresponds to a second task of the workflow and the third display element 518 corresponds to a third task of the workflow. As shown in FIG. 5B, the second display element 514 provides text indicating that the user consents to using an electronic signature. FIG. 5C shows the third display element 516 providing an electronic signature pad enabling the user to provide the signature needed for the credit card application. In one or more embodiments, the third display element 516 enables a user to enter a signature using a touch element (e.g., a finger or stylus). In some embodiments, the third display element 516 allows entry of the signature using a device peripheral (e.g., a mouse).

As mentioned above, in one or more embodiments, the workflow system 104 provides the second display element 514 to the client device after the user completes the first task. In particular, the workflow system 104 receives an update indicating that the user has completed the first task. In response to receiving the update, the workflow system 104 provides the second display element 514 corresponding to the second task of the workflow. When the user completes the second task, the workflow system 104 receives a further update and provides the third display element 516. In some embodiments, however, the workflow system 104 does not automatically provide subsequent display elements in response to receiving an update that the user has completed a task; rather, the workflow system 104 provides a notification to the user regarding the subsequent task and waits to receive a user selection of the notification before providing a display element corresponding to the subsequent task. To illustrate, a user may complete a task that requires a follow-up task (e.g., verification that the task was correctly completed, upload of a document, etc.) performed by the workflow system 104 or a backend operator of the system, such as a support representative, before the user can proceed to the next task of the workflow. The follow-up task may not be completed immediately; therefore, the workflow system 104 does not provide the next display element upon completion of the task. In such a situation, the workflow system 104 waits to receive an indication that the follow-up task has been completed and then provides a new notification to the user indicating that the next task of the workflow is available. When the user selects the new notification, the workflow system 104 provides the subsequent display element for the new task.

Figure 6:
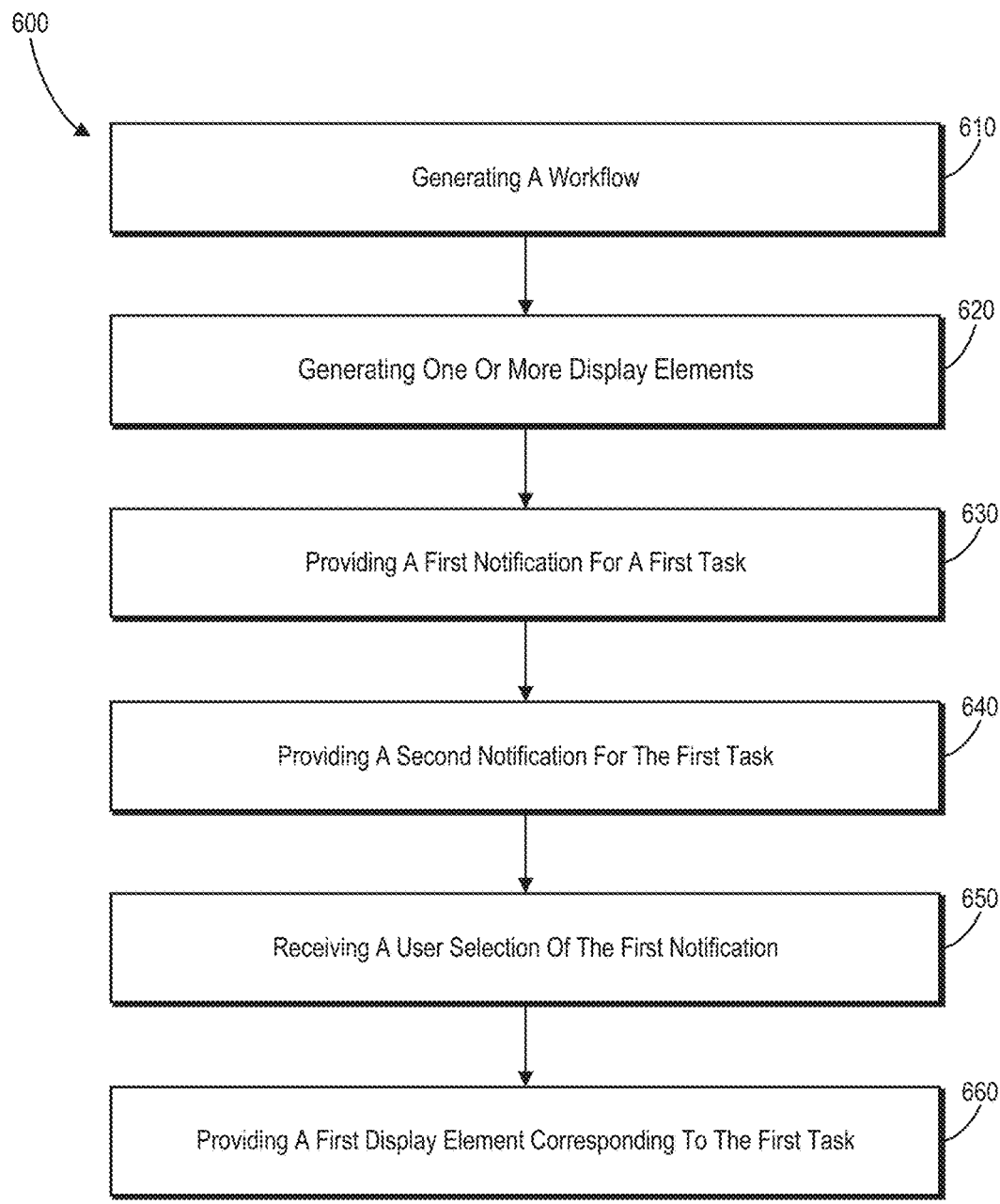
FIG. 6 illustrates a flowchart of a series of acts for providing a workflow to a user in accordance with one or more embodiments.

Turning now to FIG. 6, this figure illustrates a series of acts 600 for providing a workflow to a user. While FIG. 6 illustrates acts according to one embodiment, alternative embodiments may omit, add to, reorder, and/or modify any of the acts shown in FIG. 6. The acts of FIG. 6 can be performed as part of a method. In one or more embodiments, a non-transitory computer readable storage medium can comprise instructions that, when executed by one or more processors, cause a computing device to perform the acts of FIG. 6. In still further embodiments, a system can perform the acts of FIG. 6.

The series of acts 600 includes an act 610 of generating a workflow. For example, act 610 involves generating a workflow comprising a plurality of tasks. In one or more embodiments, the workflow requires a user to perform the plurality of tasks. In some embodiments, the workflow requires participation by multiple users. In further embodiments, the workflow requires participation from a combination of users and a backend operator of the workflow system 104, such as a support representative.

The series of acts 600 also includes an act 620 of generating one or more display elements. For example, act 620 involves generating one or more display elements corresponding to the plurality of tasks. Each display element can correspond to one task or to multiple tasks. In one or more embodiments, each display element from the one or more display elements comprises at least one of an informational video, an informational document, a signature pad, a digital fillable form, terms accompanied by an option to accept or reject the terms, or an interface for capturing and sending images of a check. In some embodiments, each display element further comprises a selectable option configured to, when selected, initiate a video chat between a client device associated with the user and a support terminal.

The series of acts 600 also includes an act 630 providing a first notification for a first task. For example, act 630 involves providing a first notification for a first task of the plurality of tasks to a first user via a first communication channel. In one or more embodiments, providing the first notification via the first communication channel comprises providing a mobile application notification to a mobile device associated with the first user. It will be appreciated, however, that the workflow system 104 can send the notification to an application stored on any client device. In some embodiments, the workflow system 104 further provides a push notification to the client device.

Additionally, the series of acts 600 includes an act 640 of providing a second notification for the first task. For example, act 640 involves providing a second notification for the first task to the first user via a second communication channel. In one or more embodiments, providing the second notification for the first task via the second communication channel comprises sending a notification email to an email address associated with the first user, wherein the notification email comprises a link to the first display element. The notification email can then be accessed by the first user using any client device that can access email.

Further, the series of acts 600 includes an act 650 of receiving a user selection of the first notification. For example, act 650 involves receiving, from a client device associated with the first user, a user selection of the first notification. To illustrate, in embodiments where the workflow system 104 sends the first notification as a mobile application notification to a mobile device associated with the first user, the workflow system 104 receives a user selection of the mobile application notification. Alternatively, the workflow system 104 can receive a user selection of the push notification sent to the mobile device.

The series of acts 600 also includes an act 660 of providing a first display element corresponding to the first task. For example, act 660 involves, in response to receiving the user selection, providing a first display element of the one or more display elements to the client device through the first communication channel, wherein the first display element corresponds to the first task. In one or more embodiments, providing the first display element to the client device through the first communication channel comprises pushing the first display element to the client device through a WebSocket server. In some embodiments, in response to receiving the user selection, the workflow system 104 further provides a video chat transmitted between the client device and a support terminal via a third communication channel and provides instructions causing the client device to display the first display element and the video chat concurrently.

In one or more embodiments, the series of acts 600 further includes receiving an update indicating a completion of the first task. In response to receiving the update, the workflow system 104 provides a second display element of the one or more display elements to the client device through the first communication channel, wherein the second display element corresponds to a second task of the plurality of tasks. In some embodiments, however, the workflow system 104 receives, through the first communication channel, an update indicating a rejection of the first task by the first user. In response to receiving the update indicating the rejection, the workflow system 104 reassigns the first task to a second user and provides a third notification for the first task to the second user via a third communication channel. The workflow system 104 can then receive, from a second client device associated with the second user, a second user selection of the third notification. In response to receiving the second user selection, the workflow system 104 provides the first display element to the second client device through the third communication channel.

In some embodiments, the series of acts 600 further includes providing a third notification for a second task of the plurality of tasks to a second user via a third communication channel; receiving, from a second client device associated with the second user, a second user selection of the third notification; and in response to receiving the second user selection, providing a second display element of the one or more display elements to the second client device through the third communication channel, wherein the second display element corresponds to the second task. In other words, the workflow can require a first user to perform a first task and a second user to perform a second task whether or not the first user has rejected the first task. Consequently, the workflow system 104 can notify the first user of a first task and the second user of a second task. In some embodiments, the first task and the second task are similar (e.g., both tasks require the users to provide a signature). In some embodiments, however, the second task is unique to the second user.

In some embodiments, the series of acts 600 further includes receiving, through the first communication channel, an update indicating a completion of the workflow. In response to receiving the update, the workflow system 104 generates a session review report comprising a summary of the plurality of tasks and user interactions detected by the client device, wherein the user interactions correspond to the plurality of tasks. The workflow system 104 can provide the session review report to the user as a record of the user's completion of the workflow.

Figure 7:
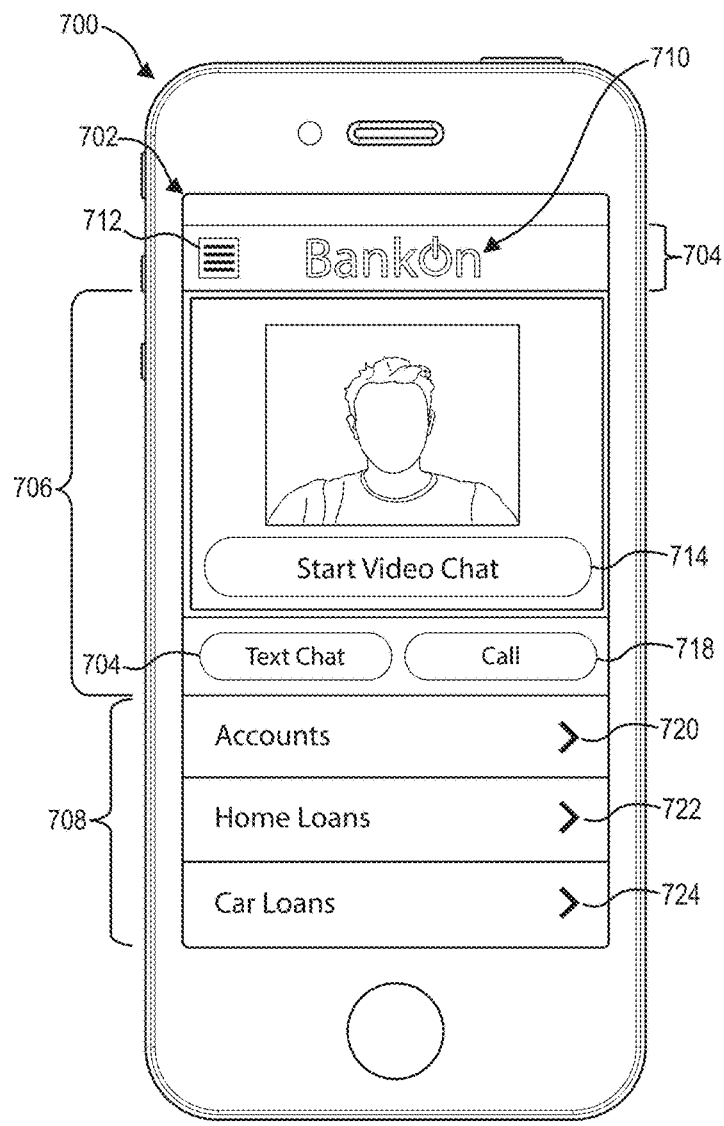
FIG. 7 illustrates a mobile device displaying an application user interface operable to enable a mobile device user to interact with a mobile application in accordance with one or more embodiments.

FIG. 7 illustrates a mobile device 700 displaying an application user interface 702 operable to allow a user (i.e., one of the users 122a-122b) to interact with the workflow system 104 through a mobile application in accordance with one or more embodiments. In one or more embodiments, the user accesses the application user interface 702 through the application interface 402 discussed with reference to FIG. 4A. The application user interface 702 includes a heading portion 704, a customer support portion 706, and a navigation portion 708. In alternate embodiments, the application user interface 702 may include other portions relevant to the mobile application.

Heading portion 704 of application user interface 702 provides general information and options for the user. FIG. 7 illustrates heading portion 704 providing a title 710 and a menu 712. The title 710 provides the title of the business but may alternatively provide the name of the mobile application or another title deemed sufficient for the purposes of the mobile application. The menu 712 provides a drop down menu with pre-selected options for interacting with the mobile application. For example, the drop down menu provides the user with an option of logging into a user account or navigating to a home page of the mobile application. In one or more alternative embodiments, the menu 712 may be replaced with links in the heading portion 704 providing the user with similar options.

Customer support portion 706 provides options to contact a support representative (i.e., the support representative 116) to receive assistance. For example, a user who is unfamiliar with a mobile application may need assistance in finding information or performing a desired function. By way of illustration, in the context of a mobile banking application, the user may require help in applying for a loan, finding account balances, performing a check deposit, making a credit card payment, or interacting with the mobile application in another way.

As illustrated in FIG. 7, the customer support portion 706 includes multiple selectable buttons the user can select to contact the support representative. For example, the customer support portion 706 of FIG. 7 includes a video chat button 714, a text chat button 716, and a phone call button 718, which the mobile application may use to initiate a video chat, a text chat, or a phone call respectively. In response to a selection, the mobile device 700 sends a request to initiate a communications session of the type associated with the button. For example, by selecting the video chat button 714, the mobile device 700 sends a request to begin a video chat session with the support representative.

Alternatively, the customer support portion 706 may include other selectable buttons to contact the support representative, such as an option to e-mail or send a voice-recorded message. It will also be appreciated that a number of selectable buttons may be present in the customer support portion 706 in any combination. To illustrate, the customer support portion 706 may include selectable buttons for video chat, text chat, phone call, and email message, or the customer support portion 706 may only include the video chat button 714.

The navigation portion 708 presents the user with quick navigational options. For example, the navigation portion 708 of FIG. 7 presents options to navigate to a page comprising information on accounts 720, information on home loans 722, or information on car loans 724. In one or more embodiments, other options deemed useful to the user may also be present.

Figure 8:
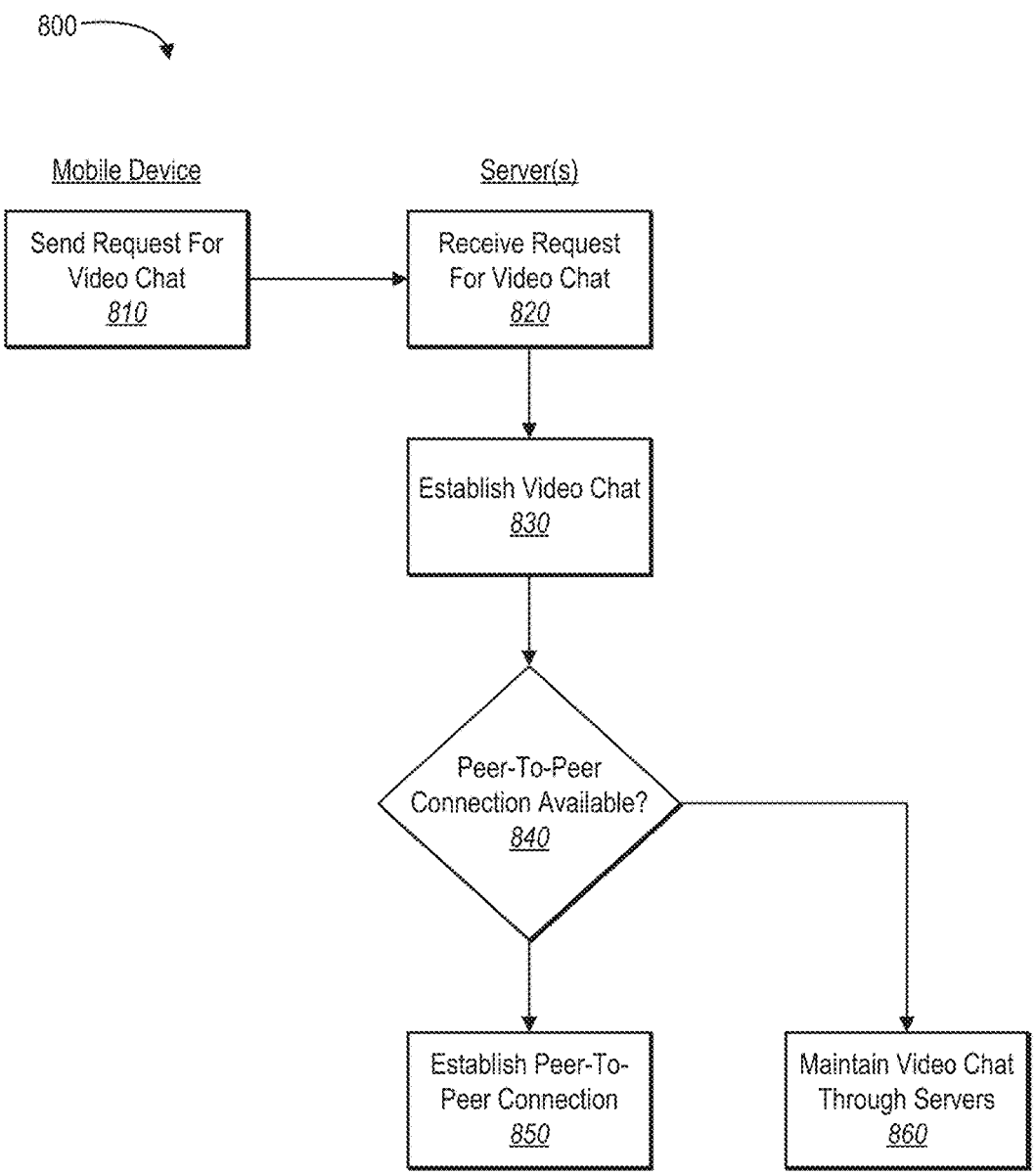
FIG. 8 illustrates a flowchart of a series of acts in a method of initiating a video chat connection between a mobile device and a support terminal in accordance with one or more embodiments.

As mentioned previously, one or more embodiments include a video chat between a client device and a support terminal. In particular, the workflow system 104 can initiate the video chat when providing the first display element or in response to receiving a user request for a video chat from a client device (e.g., resulting from a user selection of a video chat option). FIG. 8 illustrates a flowchart of a series of acts 800 of initiating a video chat connection between a mobile device and a support terminal in accordance with one or more embodiments. Though FIG. 8 illustrates the series of acts 800 implemented in the context of a user using a mobile device, one or more embodiments involve the user utilizing another type of client device (e.g., desktop, laptop, tablet, etc.) The series of acts 800 is performed in a hardware environment that includes the environment 100. The series of acts 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the series of acts 800 includes an act 810 of sending, from a mobile device a request to initiate a video chat. The request can initially be processed by a series of one or more servers, such as the server(s) 102 of FIG. 1. As discussed above, the server(s) 102 may contain a load balance server, a signaling server, and a STUN/TURN server. Alternatively, the request may be sent through a single server that performs the same functionality as the combination of servers. In particular, the act 810 includes sending a request from the mobile device to initiate a video chat between the mobile device and a support terminal.

Moreover, as illustrated in FIG. 8, the series of acts 800 also includes an act 820 of a receiving the request to initiate a video chat. Furthermore, FIG. 8 illustrates that the series of acts 800 also includes an act 830 of establishing a video chat between the mobile device and a support terminal. In particular, the series of acts 830 comprises establishing a first connection between the mobile device and the support terminal and conducting a video chat transmitted across the first connection. In particular, the first connection can comprise a connection established through the server(s) 102. In one or more embodiments, the first connection comprises the third communication channel discussed above with reference to FIG. 6.

As shown in FIG. 8, the series of acts 800 also includes the act 840 of determining whether a peer-to-peer connection is available between the mobile device and the support terminal. In response to determining that a peer-to-peer connection is available, the series of acts 800 proceeds to the act 850 of establishing a peer-to-peer connection between the mobile device and the support terminal. In particular, the act 850 switches the video chat from being conducted via a connection through the server(s) 102 to a peer-to-peer connection (i.e., the peer-to-peer connection 126). In one or more embodiments, the act 850 may include severing the connection through server(s) 102 after the peer-to-peer connection has been established between the mobile device and the support terminal. One will appreciate in light of the disclosure herein that the use of a peer-to-peer connection to conduct the video chat can reduce system resources needed for the video chat, provide greater flexibility, and in some cases allow for quicker communication between the mobile device and the support terminal.

Alternatively, in response to determining that a peer-to-peer connection is not available, the series of acts 800 proceeds to the act 860 of maintaining the video chat through the server(s) 102. In one or more embodiments, the video chat may be maintained through the server(s) 102 whether or not a peer-to-peer connection is available.

Figure 9:
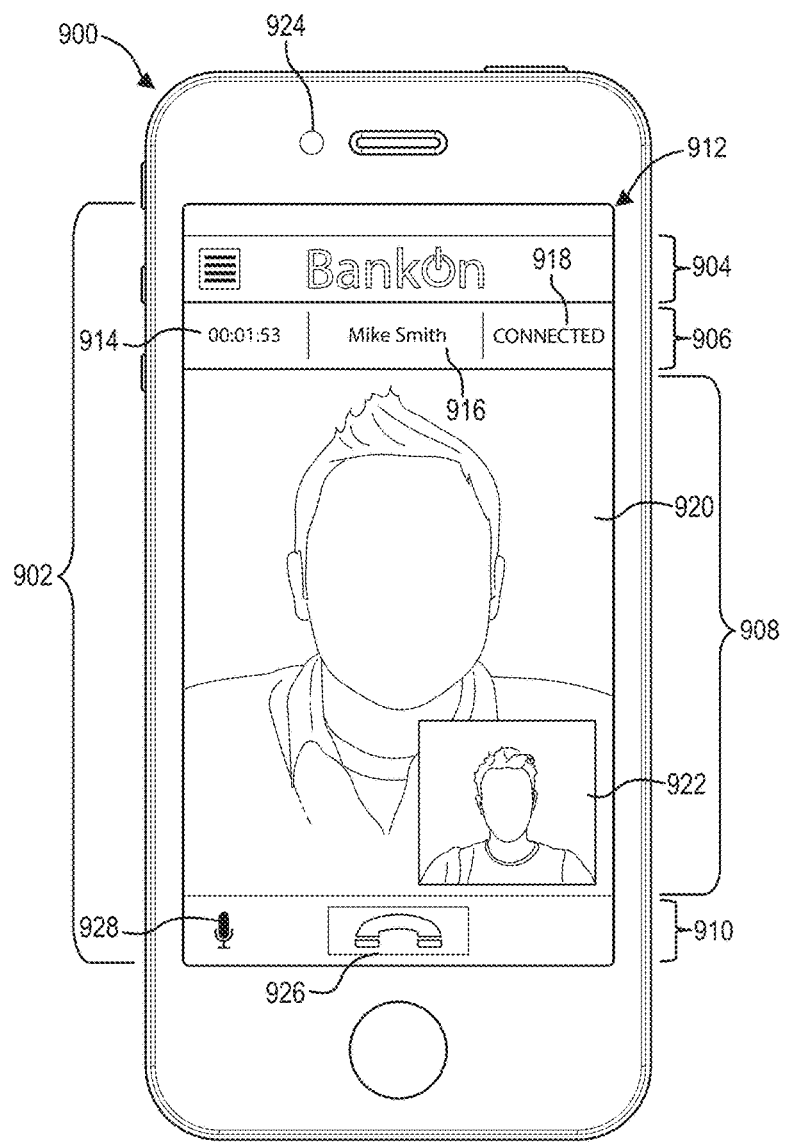
FIG. 9 illustrates a mobile device displaying a video chat interface in accordance with one or more embodiments.

FIG. 9 illustrates a mobile device 900 displaying a video chat interface 902 after a video chat has been established between a mobile device and a support terminal. The video chat interface 902 includes a heading portion 904, a session information portion 906, a video chat display portion 908, and a session control portion 910. As illustrated in FIG. 9, the video chat interface 902 utilizes the entirety of the mobile device display screen 912. In one or more alternative embodiments, the video chat interface utilizes less than the entirety of the mobile device display screen 912 in response to receiving a default display element (not shown) from a support terminal immediately after the video chat is established.

As illustrated in FIG. 9, the session information portion 906 of the video chat interface 902 displays information regarding the video chat session conducted between the mobile device and the support terminal. In particular, the session information portion 906 includes a time-keeping portion 914, a support representative identity portion 916, and a connection status portion 918. The time-keeping portion 914 displays the duration of the current video chat session. The support representative identity portion 916 displays the name of the support representative engaging in the video chat session. The connection status portion 918 displays the status of the connection between the mobile device and the support terminal. In one or more embodiments, the connection status portion 918 can indicate whether the video chat is being conducted via a peer-to-peer connection or not.

As illustrated in FIG. 9, the video chat display portion 908 includes a support representative display 920 and a mobile device user display 922. In particular, the support representative display 920 displays video content captured by the support terminal. The mobile device user display 922 displays video content captured by a camera 924 of the mobile device 900. As shown in FIG. 9, mobile device user display 922 is displayed in a lower right corner of the video chat display portion 908. Alternatively, the mobile device user display 922 may be displayed in another location of the video chat display portion 908. In one or more embodiments, the mobile device user display 922 may be relocated to another location in response to detecting a user interaction. For example, a user may select and, with a dragging motion, relocate the mobile device user display 922 to another location.

As further illustrated in FIG. 9, the session control portion 910 of the video chat interface 902 includes a session end option 926 and a microphone mute option 928. Alternatively, one or more embodiments may include other options, such as a record option to record the audio content, visual content, or both from the video chat session.

In establishing a video chat between the mobile device and the support terminal, the workflow system 104 can send instructions to the client device to display the video chat concurrently with the display element. For example, the workflow system can send a trigger to the mobile device that causes the mobile device to partition its display into multiple panes and to display the video chat in one pane and the display element in another pane. In one or more embodiments, the trigger comprises a piece of JavaScript or other code that, when received by the mobile device, cause the mobile device to split the display into multiple panes. More specifically, the trigger can cause the mobile device to execute code previously installed on the mobile device as part of the mobile application. Such code can cause the mobile device to provide multiple panes as described hereinafter. FIGS. 10A-10F provide various exemplary embodiments of a mobile device 1000 displaying a dual pane display 1002 in which the mobile device displays a display element 1004a-1004f concurrently with a video chat.

As illustrated in FIGS. 10A-10F, the mobile device 1000 divides the mobile device display screen 1006 into a first pane 1008 and a second pane 1010 (in alternative embodiments there may be more than two panes). As illustrated, the mobile device provides the video chat in the first pane 1008 and one of the display elements 1004a-1004f in the second pane 1010. Alternatively, the mobile device 1000 may divide the display screen 1006 into three or more panes in response to receiving multiple display elements simultaneously or in response to receiving a display element formatted to use multiple panes.

In one or more embodiments, a mobile device user may choose to accept or reject the display element before it is displayed in the second pane 1010. For example, in response to receiving a display element 1004a-1004f and the accompanying trigger, the display screen 1006 may divide into a first pane 1008 and a second pane 1010. A screen may be subsequently provided in the second pane 1010, displaying selectable options to the user of the mobile device 1000 to either accept or reject the display element. The display element 1004a-1004f will display in the second pane 1010 only when the user selects to accept it. Otherwise, if the user chooses to reject the display element 1004a-1004f, the first pane 1008 and the second pane 1010 may converge back into a single display (such as that shown in FIG. 9) and the workflow system 104 can reassign the task corresponding to the display element to another user.

Additionally, the mobile device 1000 may modify the size of the first pane 1008 and the second pane 1010 on the display screen 1006 or of any other panes based on the display element received. For example, the display element received may require more than half of the display screen 1006. As a result, the display screen 1006 will divide into a first pane 1008 and a second pane 1010, wherein the second pane 1010 fills the majority of the display space of the display screen 1006 and the first pane 1008 fills the remaining space available.

In one or more embodiments, a mobile device user may modify the display elements 1004a-1004f Alternatively, a display element may be static and only meant for viewing. In one or more embodiments, providing and modifying a display element 1004a-1004f may occur independent of any interaction with the video chat provided in the first pane 1008.

Figure 10A:
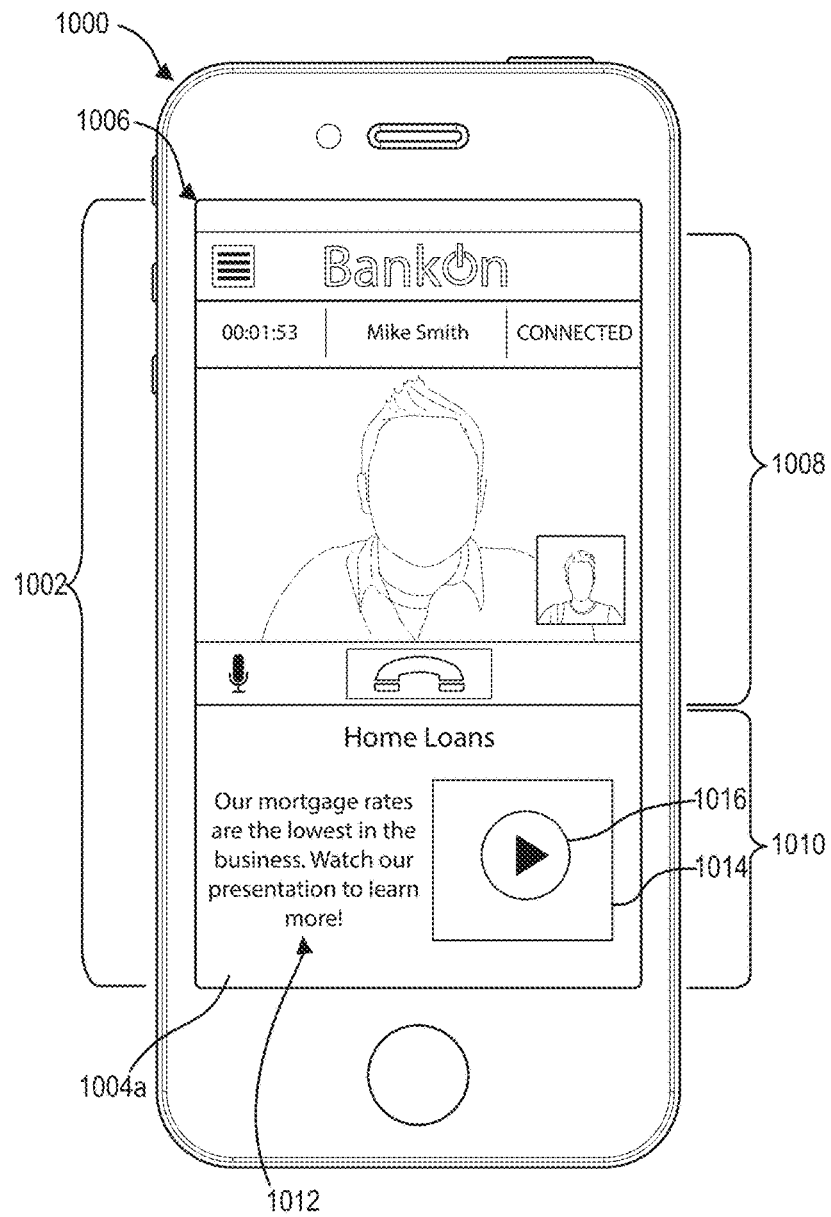
FIGS. 10A-10F illustrates a mobile device displaying various views of a dual pane display in accordance with one or more embodiments.

The display element 1004a illustrated in FIG. 10A is an informational slide comprising a text portion 1012 and a video portion 1014. The display element 1004a provides exemplary information regarding a banking service provided by the mobile application. By way of illustration, the display element 1004a displays information regarding mortgage rates.

The video portion 1014 plays an informational video in response to a user interaction. For example, the video portion 1014 plays the video in response to detecting a user selection of a play button 1016. Additionally, or alternatively, the video portion 1014 may play the video in response to detecting a user swiping gesture or a user voice command. Alternatively, the video portion 1014 may play the video immediately after the display element 1004a is displayed on the second pane 1010. One or more alternative embodiments may comprise an informational display element comprising only an informational slide or document or only an informational video. Additionally, or alternatively, the informational slide can comprise images separate from or in addition to any informational text.

Figure 10B:
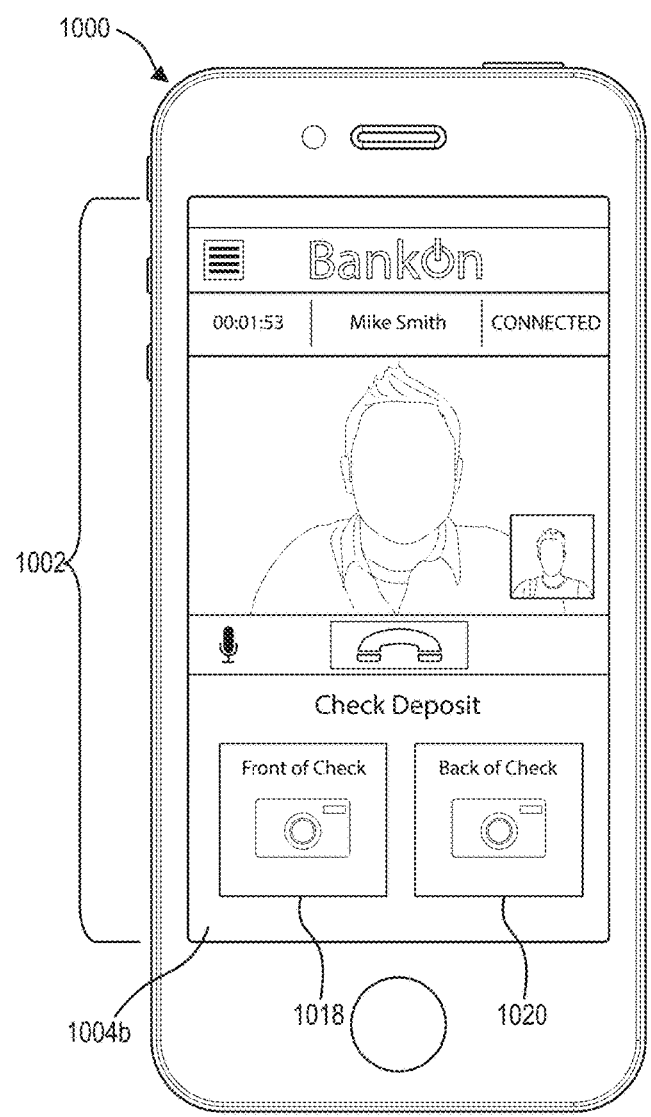

FIG. 10B illustrates another embodiment of the mobile device 1000 displaying a dual pane display 1002. In particular, the mobile device 1000 provides a display element 1004b in the second pane 1010 with an interface for capturing multiple images for check deposit. In particular, display element 1004b comprises a first button 1018 and a second button 1020, wherein the first button designates a captured image as a front view of a check and the second button 1020 designates a captured image as a back view of a check. Upon detecting a user selection of the first button 1018 or the second button 1020, the video chat provided in the first pane 1008 overlays the display of the video chat with a viewfinder display (not shown), wherein the viewfinder display provides a representation of image data captured by a camera (camera on back of device not shown) of the mobile device 1000. Alternatively, when mobile device 1000 receives display element 1004b, it may also receive a camera trigger that immediately activates the camera and overlays the video chat in the first pane 1008 with the viewfinder display.

While the first pane 1008 provides the viewfinder mode, the video chat may be continuously received by the mobile device 1000. Alternatively, the visual data from the video chat may temporarily cut off until a user indicates that capturing images is done. Additionally, or alternatively, the audio from the video chat transmission is still available while the mobile device user captures the images, so that the support representative may guide the mobile device user through the process.

An image of the check captured by the mobile device 1000 is automatically sent to the support terminal for verification and check deposit. Alternatively, in one or more embodiments, the display element 1004b may include an additional button for sending an image file that has been captured to the satisfaction of the mobile device user.

One skilled in the art will appreciate that display element 1004b may function to capture images of documents other than checks and that FIG. 10B is provided only as an illustration. For example, in one or more embodiments, the display element 1004b may enable a user to capture an image of a contract, identification, or other document that may be required by the support representative.

Figure 10C:
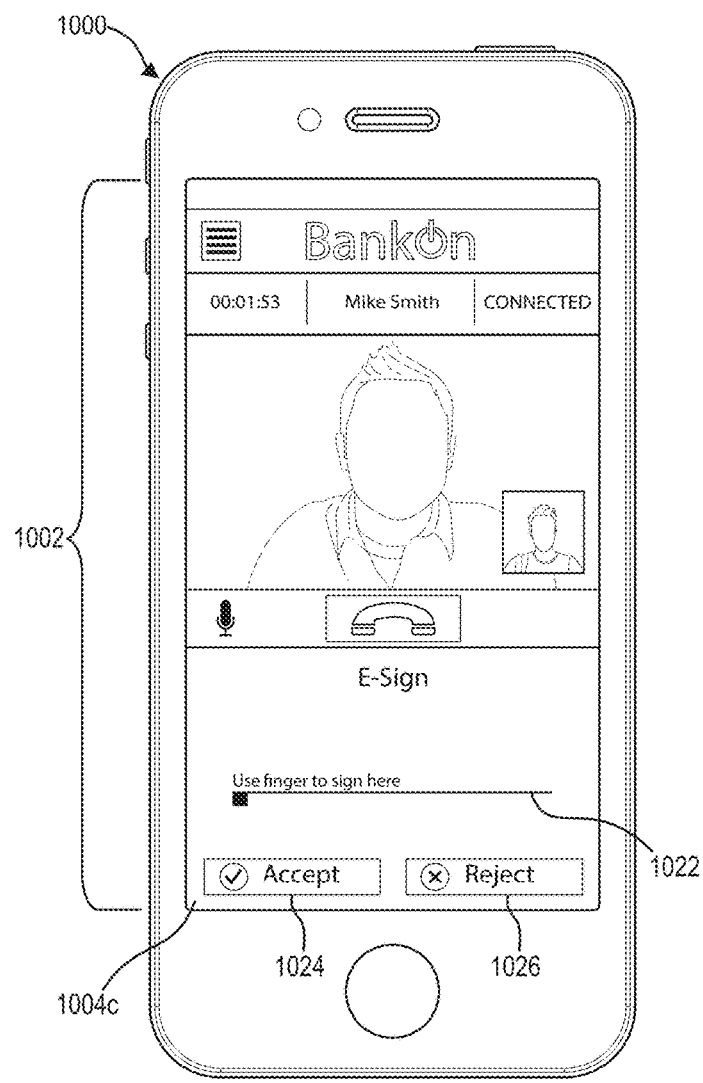

FIG. 10C illustrates yet another embodiment of the mobile device 1000 displaying a dual pane display 1002. In particular, the mobile device 1000 provides a display element 1004c in the second pane 1010 that is a signature pad enabling a user to enter a signature. In particular, the display element 1004c comprises a signature line 1022, an accept button 1024, and a reject button 1026. The display element 1004c changes, in response to detecting a user interaction along the signature line 1022, a signature of the mobile device user. For example, a user may use a finger or a stylus to enter a signature upon the signature line 1022. After entering the signature, the mobile device user may select to accept or reject the signature. Upon detecting a selection of the accept button 1024, the signature is sent to the support terminal. Upon detecting a selection of the reject button 1026, the signature line 1022 is cleared for the mobile device user to sign again.

Figure 10D:
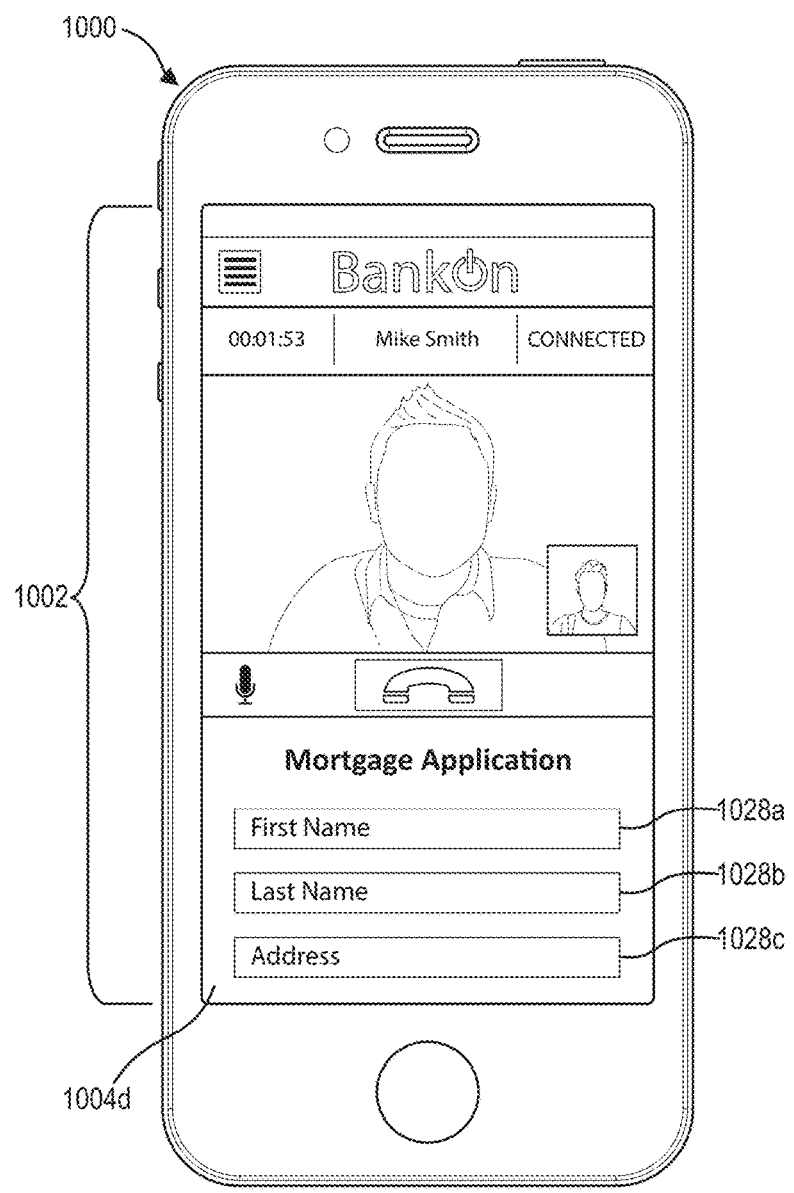

FIG. 10D illustrates yet another embodiment of the mobile device 1000 displaying a dual pane display 1002. In particular, the mobile device 1000 provides a display element 1004d in the second pane 1010 that is a fillable form that enables the mobile device user to enter input into the form. In particular, the display element 1004d comprises fillable lines 1028a-1028c. By way of illustration, fillable lines 1028a-1028c instruct a user to input a first name, a last name, and an address, respectively; but it will be appreciated that the display element 1004d may instruct a user to input other types of information as well. For example, the display element 1004d may ask for a user's birthday, state of residence, or driver's license number.

Upon detecting a user selection of one of fillable lines 1028a-1028c, the display element 1004d presents the mobile device user with an alphanumeric keypad for entering information into the corresponding line. Additionally, or alternatively, display element 1004d may present the user with a list of optional inputs where there are a limited number of inputs available or acceptable. For example, if a fillable line instructed a user to input a state of residence, upon selecting that fillable line to input the information, the display element 1004d may present the user with a list of states that may be chosen for input. Additionally, or alternatively, the display element 1004d may accept information through voice command, wherein the user may vocally input the information requested.

It will also be appreciated by one of skill in the art that the fillable form of the display element 1004d may require information in addition to what may be displayed on a single pane. Therefore, in one or more embodiments, the display element 1004d may be scrollable, wherein a user may scroll in a direction of information or fillable lines in addition to those currently presented so the additional fillable lines may be viewed and interacted with to enter information. Alternatively, the display element 1004d may provide a fillable form on multiple pages and present a user with button options to view a subsequent or previous page of fillable lines and information.

Figure 10E:
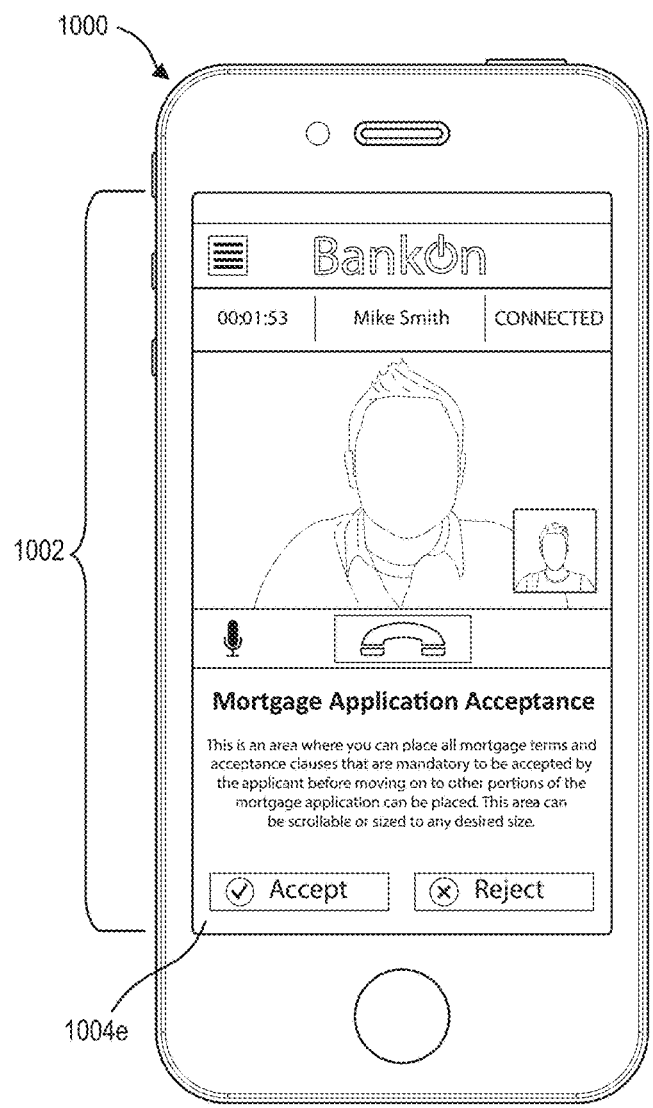

FIG. 10E illustrates yet another embodiment of the mobile device 1000 displaying a dual pane display 1002. In particular, the mobile device 1000 provides a display element 1004e in the second pane 1010 comprising terms and acceptance clauses accompanied by an option to accept or reject the terms.

Figure 10F:
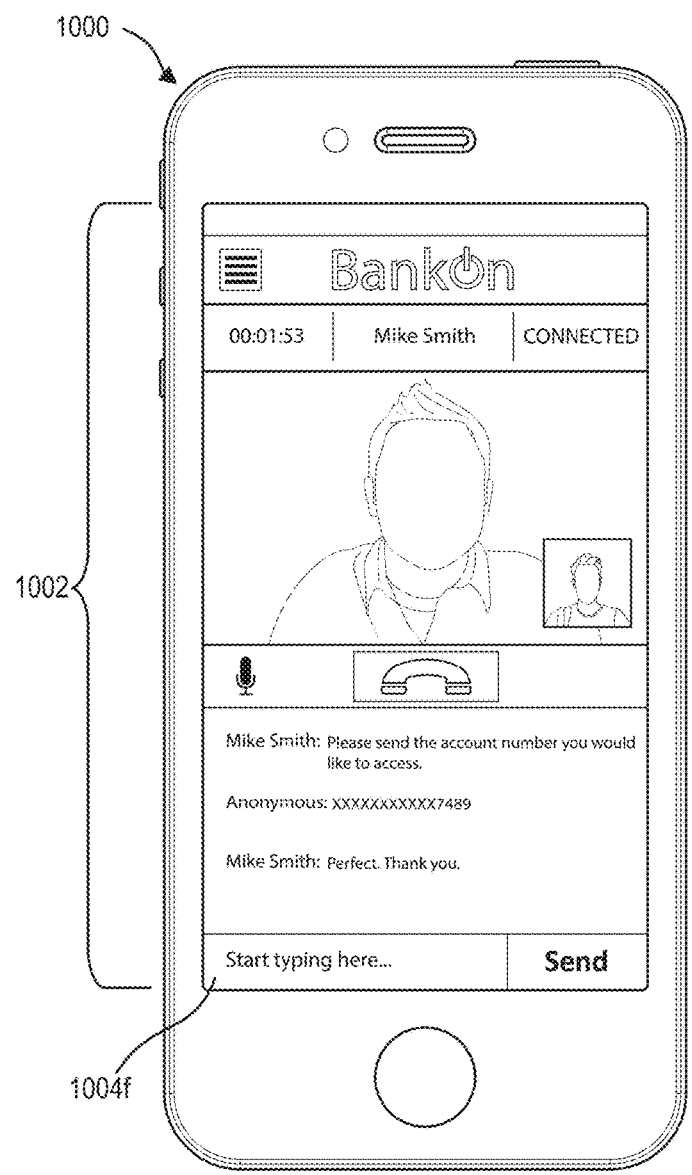

FIG. 10F illustrates yet another embodiment of the mobile device 1000 displaying a dual pane display 1002. In particular, the mobile device 1000 provides a display element 1004f in the second pane 1010, which is a text-based messaging interface enabling a user to enter in and send a text-based message to a support terminal. Additionally, the display element 1004f may receive and display text-based messages from the support terminal.

It will be appreciated by one skilled in the art that a display element may comprise elements of the display elements 1004a-1004f individually or in combination with one or more other display elements. For example, in one or more embodiment the support terminal can generate and send a computer-readable code, such as a bar code or a Quick Response Code. The computer-readable code, when scanned, can cause another device to perform an action. For example, the computer-readable code, when scanned by an ATM, can cause the ATM to disperse a predetermined amount of funds.

It will also be appreciated, as discussed above, that a display element may comprise more information or modifiable elements than can be presented on a single pane. Therefore, in one or more embodiments, the display elements 1004a-1004f may be scrollable, wherein a user may scroll in a direction where information or modifiable elements in addition to those currently presented may be viewed and interacted with to enter information. Alternatively, the display elements 1004a-1004f may provide information or interactive elements on multiple pages and present a user with button options to view a subsequent or previous page.

Figure 11:
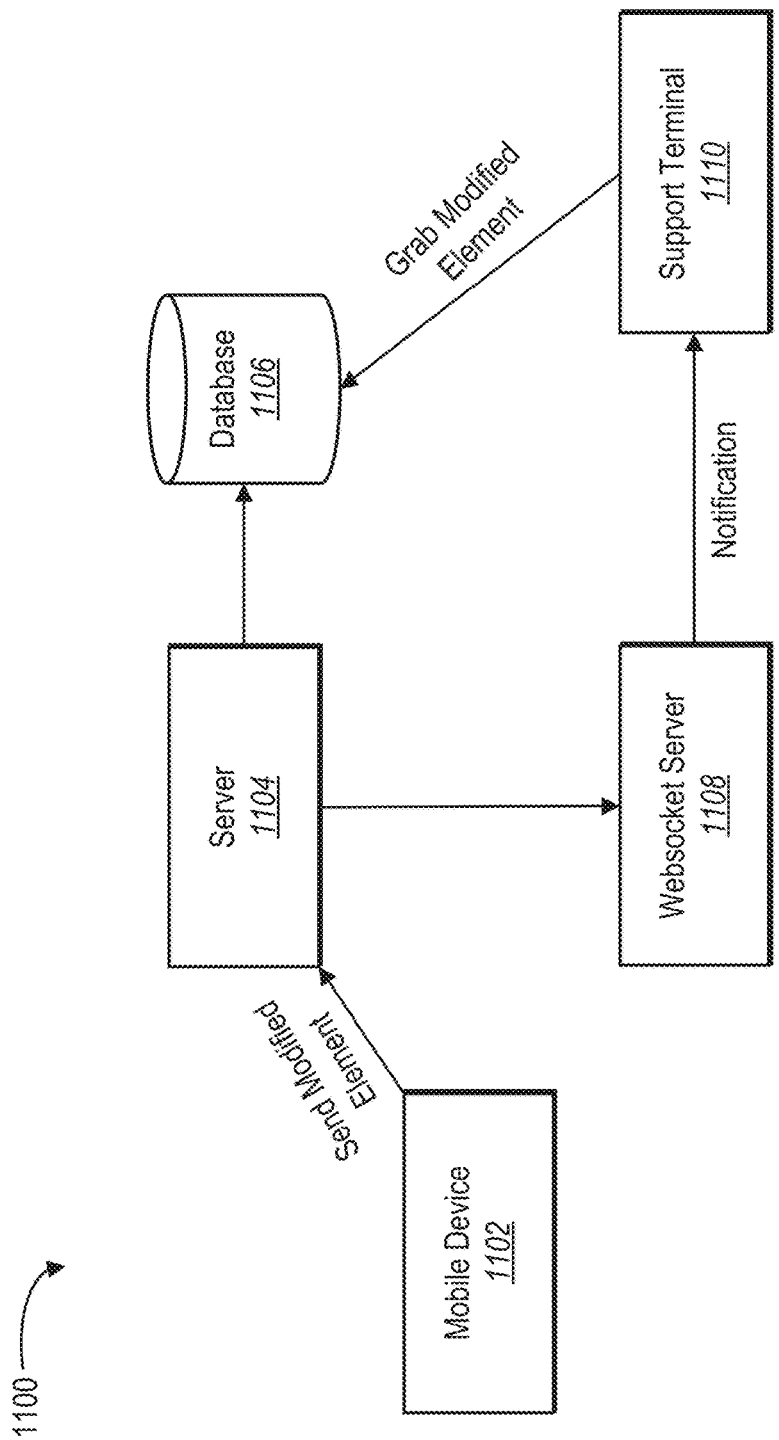
FIG. 11 illustrates an example implementation of a system used to send a modified display element. in accordance with one or more embodiments.

FIG. 11 illustrates an example implementation of a system 1100 used to send a modified display element to a support terminal. In one or more embodiments, the system 1100 comprises components used in the environment 100 of FIG. 1 and the environment 100 can perform the same operations as the system 1100. In other words, the workflow system 104 operates within the environment 100 to implement the system 1100. As illustrated in FIG. 11 the system 1100 comprises a mobile device 1102, a server 1104, a database repository 1106, a WebSocket server 1108, and a support terminal 1110.

The system 1100 establishes a connection between the mobile device 1102 and the database repository 1106 through the server 1104. In one or more embodiments, the connection is a third connection different from a first connection used to establish a video chat between the mobile device 1102 and the supporter terminal 1110 and different from a second connection used to enable the support terminal 1110 to push display elements to the mobile device 1102. The server 1104 enables the mobile device 1102 to securely transmit a modified display element to the database repository 1106. As illustrated in FIG. 11, the server 1104 is a single server. Alternatively, the third connection may be made through a series of servers.

After receiving a modified display element, the server 1104 forwards the modified display element to the database repository 1106 and sends a notification to the support terminal 1110 through the WebSocket server 1108. In one or more alternative embodiments, the notification may be sent to the support terminal directly from the mobile device 1102. The notification indicates that the database repository 1106 has received the modified display element and provides a location of the element within the database repository 1106 so the support terminal 1110 may grab the modified element. Additionally, or alternatively, the notification may include a link to the location of the modified display element, enabling the support terminal 1110 to quickly acquire the modified element.

The database repository 1106 may comprise a service that allows for the deposit and retrieval of electronic files. For example, the database repository 1106 may be an electronic drop box, email service, or other cloud-based technology that allows electronic file sharing.

Though not explicitly illustrated in FIG. 11, one or more embodiments use the system 1100 to provide notifications and display elements to the mobile device 1102. For example, the server 1104 can send a notification of a task to the mobile device 1102 (e.g., through the WebSocket server 1108). If the user indicates acceptance of the task indicated by the notification, the server 1104 can then retrieve the display element that corresponds to the task from the database 1106 and provide the display element to the mobile device 1102.

As shown by FIG. 11, the system can utilize cloud hosting (i.e., the database can comprise one or more cloud based servers). This type of cloud hosting allows for flexibility and scalability. New instances of servers can be created quickly and efficiently to ensure the system scales the use of the application as adoption rates increase. Thus, embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
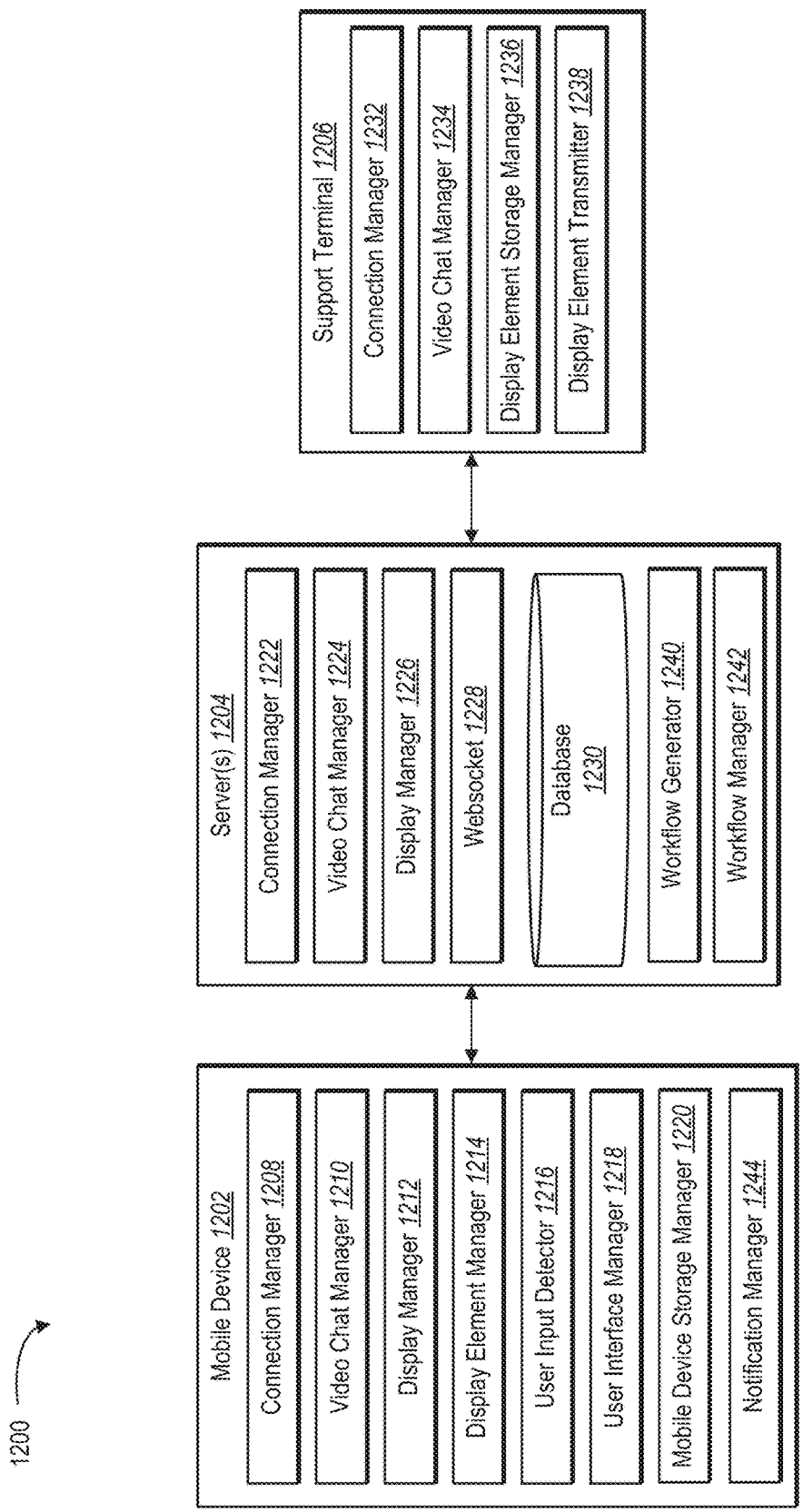
FIG. 12 illustrates a schematic diagram of a system in accordance with one or more embodiments.

Turning now to FIG. 12, additional detail will be provided regarding components and capabilities of one embodiment of the present invention comprising the environment 100 as well as the system 1100. In particular, FIG. 12 illustrates an embodiment of an exemplary system 1200. As shown, the system 1200 may include, but is not limited to, a mobile device 1202, a server(s) 1204, and a support terminal 1206. Moreover, as shown, the mobile device 1202 includes, but is not limited to, a connection manager 1208, a video chat manager 1210, a display manager 1212, a display element manager 1214, a user input detector 1216, a user interface manager 1218, a mobile device storage manager 1220, and a notification manager 1244. Additionally, as shown in FIG. 12, the server(s) 1204 includes, but is not limited to, a connection manager 1222, a video chat manager 1224, a display manager 1226, a WebSocket 1228, a database 1230, and a workflow generator 1240. Though not shown in FIG. 12, it will be appreciated that the server(s) 1204 implements the workflow system 104, the workflow system 104 having the aforementioned components. Furthermore, as shown in FIG. 12, the support terminal 1206 includes, but is not limited to, a connection manager 1232, a video chat manager 1234, a display element storage manager 1236, and a display element transmitter 1238.

As just mentioned, and as illustrated in FIG. 12, the mobile device 1202 includes the connection manager 1208. The connection manager 1208 searches for, detects, identifies, accepts, establishes, monitors, and maintains various types of connections. In particular, the connection manager 1208 establishes and maintains one or more connections between the mobile device 1202 and another device, such as the support terminal 1206. For example, when establishing a video chat between the mobile device 1202 and the support terminal 1206, the connection manager 1208 will establish and maintain a peer-to-peer connection through the duration of a video chat session.

As mentioned, and as illustrated in FIG. 12, the mobile device 1202 also includes the video chat manager 1210. The video chat manager 1210 initiates, provides for display, and maintains a video chat between the mobile device 1202 and another device, such as the support terminal 1206. In particular, the video chat manager 1210 operates in conjunction with the connection manager 1208 to establish and maintain a video chat between the mobile device 1202 and another device, such as a support terminal 1206.

Additionally, the video chat manager 1210 operates in conjunction with a number of user input/output devices, including, but not limited to cameras, microphones, display screens, touchscreens, and keypads.

As mentioned, and as illustrated in FIG. 12, the mobile device 1202 also includes the display manager 1212. The display manager 1212 maintains and changes a display presented on the mobile device 1202. In particular, the display manager 1212 works in conjunction with the user input detector 1216 to change a display of the mobile device in response to detecting a user interaction. Additionally, the display manager 1212 works in conjunction with the user interface manager 1218 to display a graphical user interface.

The display manager 1212 also changes the display of the mobile device 1202 in response to receiving triggering code through a connection to another device. For example, the display manager 1212 may receive triggering code over a connection. In response to receiving the triggering code, the display manager 1212 can divide the display of the mobile device 1202 into multiple panes, enabling the mobile device 1202 to display multiple display items within the multiple panes. As referred to herein, a "display item" refers to a visual component (e.g. character, image, video, or user interface) For example, the mobile device 1202 may be able to display separate mobile applications in the multiple panes or the mobile device may display a video chat in one pane and a display element in another.

Additionally, the display manager 1212 may modify the size of the multiple panes according to the needs of the items displayed within those panes. In particular, the display manager 1212 may increase the size of a pane if the display item within the pane requires more display space.

As mentioned, and as illustrate in FIG. 12, the mobile device 1202 also includes the display element manager 1214. The display element manager 1214 receives, sends, and provides for display elements. In particular, the display element manager operates in conjunction with the display manager 1212 to display a display element on the mobile device 1202.

Additionally, the display element manager 1214 modifies and maintains display elements. In particular, the display element manager operates in conjunction with the user input detector 1216 to detect a user input. In response to detecting a user input, the display element manager 1214 modifies the display element in accordance to the particular user interaction.

As mentioned, and as illustrated in FIG. 12, the mobile device 1202 also includes the user input detector 1216. The user input detector 1216 detects, identifies, monitors, receives, processes, captures, and/or records various types of user input. For example, the user input detector 1216 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 1216 operates in conjunction with a number of user input devices (in isolation or in combination), mouse devices, keyboards, track pads, or stylus devices. The user input detector 1216 detects and identifies various types of user interactions with user input devices, such as select events, drag events, scroll events, and so forth. For example, the user input detector 1216 detects one or more touch gestures (e.g., swipe gestures, tap gestures, pinch gestures, or reverse pinch gestures) from a user that forms a user interaction.

The user input detector 1216 communicates with, and thus detects user input with respect to, a variety of programs, applications, plug-ins, operating systems, user interfaces, or other implementations in software or hardware.

As mentioned, and as illustrated in FIG. 12, the mobile device 1202 also includes the user interface manager 1218. The user interface manager 1218 provides, manages, and/or controls a graphical user interface (or simply "user interface") for use with the system 1200. In particular, the user interface manager 1218 can facilitate presentation of information by way of an external component of the mobile device 1202. For example, the user interface manager 1218 can display a user interface by way of a display screen associated with the mobile device 1202. The user interface may be composed of a plurality of graphical components, objects, and/or elements that allow a user to perform a function. The user interface manager 1218 presents, via the mobile device 1202, a variety of types of information, including text, images, video, audio, characters, or other information. Moreover, the user interface manager 1218 provides a variety of user interfaces specific to a variety of functions, programs, applications, plug-ins, devices, operating systems, and/or components of the mobile device 1202.

The user interface manager 1218 can provide a user interface with regard to a variety of operations or applications. For example, the user interface manager 1218 provides a user interface that facilitates selecting, identifying, searching, or downloading digital files. Similarly, the user interface manager 1218 can generate a user interface that facilitates managing, editing, modifying, downloading, uploading, or sending digital images. Additional details with respect to various example user interface elements are described throughout with regard to various embodiments containing user interfaces.

In addition, as illustrated in FIG. 12, the mobile device 1202 also includes the mobile device storage manager 1220. The mobile device storage manager 1220 maintains data for the system 1200. The mobile device storage manager 1220 can maintain data of a type, size, or kind, as necessary to perform the functions of the system 1200.

Additionally, as illustrated in FIG. 12, the mobile device 1202 also includes the notification manager 1244. The notification manager 1244 receives notifications sent from the server(s) 1204 and determines how to display or otherwise provide the notifications to the user through the mobile device 1202. For example, an operating system of the mobile device 1202 can require a particular protocol to be followed when providing notifications. Consequently, the notification manager 1244 can determine how to provide a received notification in accordance with the required protocol.

Furthermore, as illustrated in FIG. 12, the server(s) 1204 includes the connection manager 1222. The connection manager 1222 searches for, detects, identifies, accepts, establishes, monitors, and maintains various types of connections. In particular, the connection manager 1222 establishes and maintains one or more connections between devices. For example, the connection manager 1222 may establish a connection between the mobile device 1202 and the support terminal 1206.

As mentioned, and as illustrated in FIG. 12, the server(s) 1204 also includes the video chat manager 1224. The video chat manager 1224 establishes, receives, transmits, and maintains a video chat between multiple devices. For example, the video chat manager 1224 may establish and maintain a video chat between the mobile device 1202 and another device, such as the support terminal 1206. In particular, the video chat manager 1224 operates in conjunction with the connection manager 1222 to establish and maintain a video chat across a connection maintained by server(s) 1204.

As mentioned, and as illustrated in FIG. 12, the server(s) 1204 also includes the display manager 1226. The display manager 1226 receives and transmits items for display on devices. In particular, the display manager 1226 can transmit items sent from one device to another device. For example, the display manager 1226 can transmit a display element sent from the support terminal 1206 to be displayed on the mobile device 1202.

As mentioned, and as illustrated in FIG. 12, the server(s) 1204 also includes the WebSocket 1228. The WebSocket 1228 is a bidirectional communication module that enables a device acting as a server to push data to a client device, rather than waiting for the client device to send a request for data, which the server then fills. In particular, the WebSocket 1228 operates in conjunction with the display manager 1226 to enable a device acting as a server to push items for display to a device acting as a client. For example, the WebSocket 1228 and the display manager 1226 work in conjunction to enable the support terminal 1206 to push a display element for display to the mobile device 1202.

As mentioned, and as illustrated in FIG. 12, the server(s) 1204 also includes the database 1230. The database 1230 operates as a database repository to store data for retrieval. The database 1230 can operate as an electronic cloud storage system (e.g. an electronic drop box). In particular, the database 1230 stores data for retrieval from a device. For example, the database 1230 can store a modified display element received from the mobile device 1202 until it is overwritten or retrieved by the support terminal 1206.

Additionally, the server(s) 1204 include the workflow generator 1240. In particular, the workflow generator 1240 generates a plurality of tasks embodied in a workflow. For example, the workflow generator 1240 can generate a workflow used to apply for a loan by compiling all of the tasks required to apply for the loan (e.g., filling out a loan application form, providing a signature, providing identification, etc.). Additionally, the workflow generator can generate one or more display elements corresponding to the plurality of tasks. The display elements can then be provided to the database 1230 for storage or transmitted directly to the mobile device 1202.

Additionally, the server(s) 1204 includes the workflow generator 1240. In particular, the workflow generator 1240 generates a plurality of tasks embodied in a workflow. For example, the workflow generator 1240 can generate a workflow used to apply for a loan by compiling all of the tasks required to apply for the loan (e.g., filling out a loan application form, providing a signature, providing identification, etc.). Additionally, the workflow generator can generate one or more display elements corresponding to the plurality of tasks. The display elements can then be provided to the database 1230 for storage or transmitted directly to the mobile device 1202.

Further, the server(s) 1204 includes the workflow manager 1242. In particular, the workflow manager 1242 manages the distribution of the workflow generated by the workflow generator 1240. For example, the workflow manager 1242 can send a first notification to a user regarding a first task via a first communication channel and a second notification via a second notification channel. Upon receiving a user selection of one of the notifications, the workflow manager 1242 can send a display element corresponding to the first task (e.g., using the WebSocket 1228) via the corresponding communication channel. When a user has completed the first task, the workflow manager 1242 can receive an update and subsequently send a second display element corresponding to the second task of the workflow.

Furthermore, as illustrated in FIG. 12, the support terminal 1206 includes the connection manager 1232. The connection manager 1232 searches for, detects, identifies, accepts, establishes, monitors, and maintains various types of connections. In particular, the connection manager 1232 establishes and maintains one or more connections between the support terminal 1206 and another device, such as the mobile device 1202. For example, when establishing a video chat between the mobile device 1202 and the support terminal 1206, the connection manager 1232 will establish and maintain a peer-to-peer connection through the duration of the video chat session.

As mentioned, and as illustrated in FIG. 12, the support terminal 1206 also includes the video chat manager 1234. The video chat manager 1234 initiates, provides for display, and maintains a video chat between the support terminal and another device, such as the mobile device 1202. In particular, the video chat manager 1234 operates in conjunction with the connection manager 1232 to establish and maintain a video chat between the support terminal 1206 and another device, such as a mobile device 1202.

Additionally, the video chat manager 1234 operates in conjunction with any number of user input/output devices, including, but not limited to cameras, microphones, display screens, touchscreens, and keypads.

As mentioned, and as illustrated in FIG. 12, the support terminal 1206 also includes the display element storage manager 1236. The display element storage manager 1236 stores display elements that may be selected and transmitted to another device, such as the mobile device 1202. In particular, the display element storage manager 1236 operates in conjunction with the display element transmitter 1238 and the connection manager 1232 to transmit a display element across a connection.

As mentioned, and as illustrated in FIG. 12, the support terminal 1206 also includes the display element transmitter 1238. The display element transmitter 1238 operates to transmit a display element across a connection to another device.

Figure 13:
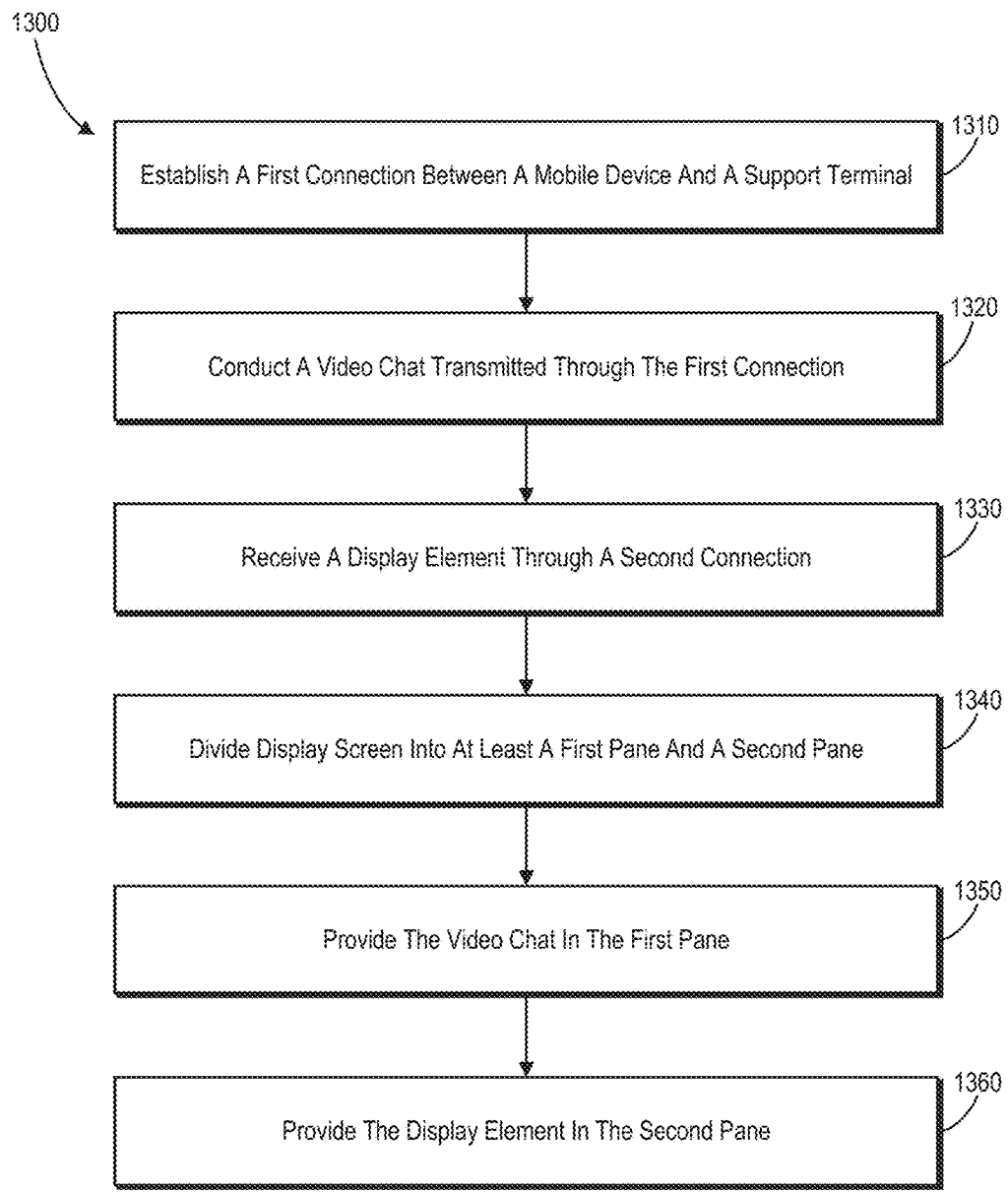
FIG. 13 illustrates a flowchart of a series of acts in a method of implementing a dual pane display in accordance with one or more embodiments.

FIG. 13 illustrates a flowchart of a series of acts 1300 of implementing a dual pane display on a mobile device in accordance with one or more embodiments of the present invention. In particular, the series of acts 1300 illustrates one or more embodiments in which the workflow system 104 establishes a video chat between a mobile device and a support terminal while providing a first display element (after receiving a user selection of a notification for a first task of a workflow) or in response to receiving a request for video chat from the mobile device. While FIG. 13 illustrates acts according to one embodiments, alternative embodiments may omit, add to, reorder, and/or modify any of the acts shown in FIG. 13. The acts of FIG. 13 can be performed as part of a method. In one or more embodiments, a non-transitory computer readable storage medium can comprise instructions that, when executed by one or more processors, cause a computing device to perform the acts of FIG. 13. In still further embodiments, a system can perform the acts of FIG. 13.

As illustrated in FIG. 13, the series of acts 1300 can include an act 1310 of establishing a first connection between the mobile device and a support terminal. In particular, the act 1310 can include sending a request for a video chat through a series of servers, establishing the first connection between the mobile device and the support terminal, establishing a peer-to-peer connection between the mobile device and the support terminal, and maintaining the first connection through the peer-to-peer connection. Alternatively, if a peer-to-peer connection is not available, the series of servers may maintain the first connection.

As shown in FIG. 13, the series of acts 1300 also includes an act 1320 of conducting a video chat transmitted through the first connection. In particular, the act 1320 conducts the video chat transmitted through the peer-to-peer connection. Alternatively, if the series of servers are maintaining the video chat, the act 1320 conducts the video chat transmitted through the series of servers.

As shown in FIG. 13, the series of acts 1300 also includes an act 1330 of receiving a display element through a second connection. In one or more embodiments, the second connection comprises the communication channel through which the workflow system 104 sent the notification (e.g., the first or second notification) for the corresponding task selected by the user. In some embodiments, the workflow system 104 establishes an entirely new connection. The act 1330 can include receiving a trigger through the second connection and executing, code stored on the mobile device, in response to receiving the trigger, to activate a capability of the mobile device. As referred to herein, a "capability" of a mobile device refers to a function of a mobile device that is available externally from the mobile application implementing the series of acts 1300 (e.g. operating a camera or composing a text-based message). Additionally, the second connection of the act 1330 can be a connection through a WebSocket server.

As shown in FIG. 13, the series of acts 1300 also includes an act 1340 of dividing a display screen of the mobile device into at least a first pane and a second pane. The act 1340 can include receiving a trigger, along with receiving the display element in the act 1330 and dividing the display screen in response. Alternatively, the act 1340 may divide the display screen into more than two panes. For example, if multiple display elements are received simultaneously, the act 1340 may divide the display screen into three or more panes.

As further shown in FIG. 13, the series of acts 1300 also includes an act 1350 and an act 1360, wherein the act 1350 provides the video chat in the first pane and the act 1360 provides the display element in the second pane. It will be appreciated, however, that both the video chat and the display element can be provided in any available pane just as effectively.

Figure 14:
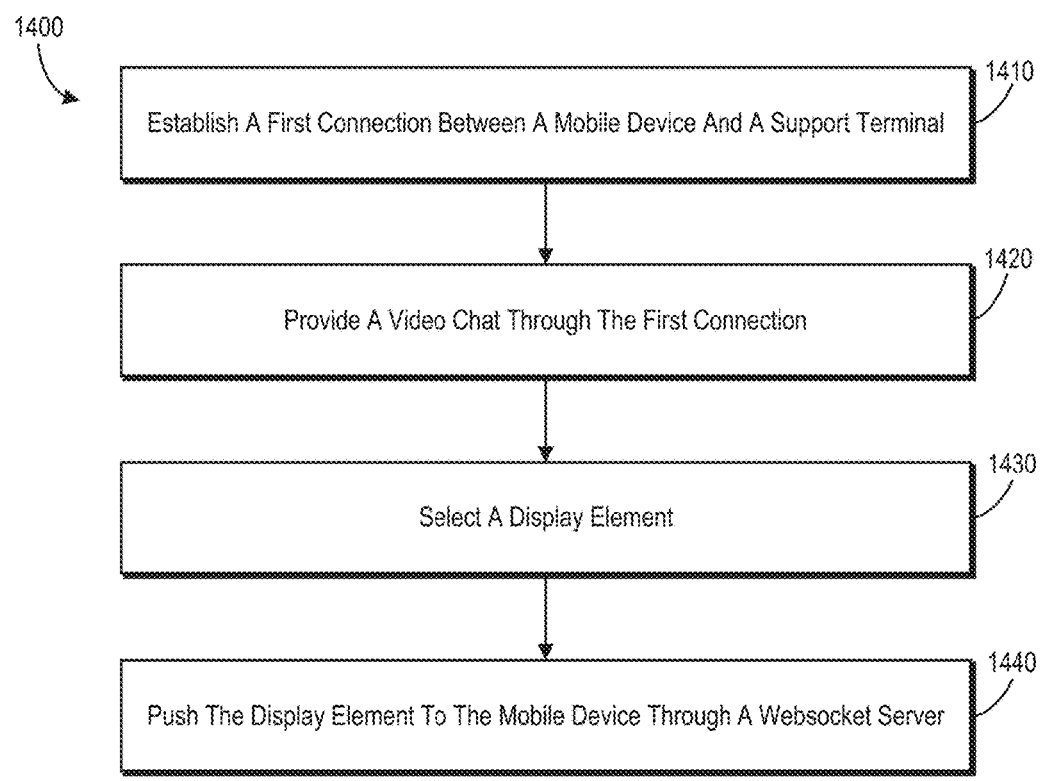
FIG. 14 illustrates a flowchart of series of acts in another method of implementing a dual pane display in accordance with one or more embodiments.

FIG. 14 illustrates a flowchart of series of acts 1400 of implementing a dual pane display on a support terminal in accordance with one or more embodiments. As illustrated in FIG. 14, the series of acts 1400 can include an act 1410 of establishing a first connection between a mobile device and a support terminal. Mirroring the act 1310 of FIG. 13, the act 1410 can include receiving a request for a video chat through a series of servers, establishing the first connection between the mobile device and the support terminal, establishing a peer-to-peer connection between the mobile device and the support terminal, and maintaining the first connection through the peer-to-peer connection. Alternatively, if a peer-to-peer connection is not available, the series of servers may maintain the first connection.

As shown in FIG. 14, the series of acts 1400 also includes an act 1420 of providing a video chat through the first connection. Similar to the act 1320, the act 1420 conducts the video chat transmitted through the peer-to-peer connection. Alternatively, if the series of servers are maintaining the video chat, the act 1320 conducts the video chat transmitted through the series of servers.

As shown in FIG. 14, the series of acts 1400 also includes an act 1430 of selecting a display element. The act 1400 can include selecting a display element from a set of display elements stored on the support terminal. Alternatively the display elements can be stored on a separate server or database and the support terminal accesses the server or database to obtain the desired display element.

Further, as shown in FIG. 14, the series of acts 1400 also includes an act 1440 of pushing the display element to the mobile device through a WebSocket server. In particular, the act 1440 can include directly pushing a display element to the mobile device. Alternatively, the act 1440 can include pushing a location of the display element to the mobile device, wherein the location can comprise a link to the database storing the mobile device. Additionally, or alternatively, the act 1440 can include pushing a trigger to the mobile device to initiate code stored on the mobile device to activate a capability of the mobile device.

Thus, as described above, the system is a unique combination of interactive panes on a mobile or tablet device that can be changed dynamically through a web socket layer that is utilized to handle real time communication actions between a second pane and the support representative sending the changes to the second pane. Further, each second pane may change based on the action or function of a representative user interacting with a backend support center. Additionally, a first pane is continuously streaming audio and video to the mobile device during the interactions with the second pane.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1500 illustrates, in block diagram form, an exemplary computing device 1500 that may be configured to perform one or more of the processes described above. One will appreciate that the environment 100 can comprise implementations of the computing device 1500. As shown by FIG. 15, the computing device 1500 can comprise a processor 1502, memory 1504, a storage device 1506, an I/O interface 1508, and a communication interface 1510. While an exemplary computing device 1500 is shown in FIG. 15, the components illustrated in FIG. 15 are not intended to be limiting. Additional or alternative components may be used in other embodiments. Furthermore, in certain embodiments, a computing device 1500 can include fewer components than those shown in FIG. 15. Components of computing device 1500 shown in FIG. 15 will now be described in additional detail.

In particular embodiments, processor(s) 1502 includes hardware for executing instructions, such as those making up a computer program. As an example and not by way of limitation, to execute instructions, processor(s) 1502 may retrieve (or fetch) the instructions from an internal register, an internal cache, memory 1504, or a storage device 1506 and decode and execute them. In particular embodiments, processor(s) 1502 may include one or more internal caches for data, instructions, or addresses. As an example and not by way of limitation, processor(s) 1502 may include one or more instruction caches, one or more data caches, and one or more translation lookaside buffers (TLBs). Instructions in the instruction caches may be copies of instructions in memory 1504 or storage 1506.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example and not by way of limitation, storage device 1506 can comprise a non-transitory storage medium described above. The storage device 1506 may include a hard disk drive (HDD), a floppy disk drive, flash memory, an optical disc, a magneto-optical disc, magnetic tape, or a Universal Serial Bus (USB) drive or a combination of two or more of these. Storage device 1506 may include removable or non-removable (or fixed) media, where appropriate. Storage device 1506 may be internal or external to the computing device 1500. In particular embodiments, storage device 1506 is non-volatile, solid-state memory. In particular embodiments, storage device 1506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a stylus or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1510. As an example and not by way of limitation, computing device 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing device 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1500 may include any suitable communication interface 1510 for any of these networks, where appropriate.

The computing device 1500 can further include a bus 1512. The bus 1512 can comprise hardware, software, or both that couples components of computing device 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
generating a workflow comprising a plurality of tasks;
generating one or more display elements corresponding to the plurality of tasks;
providing a plurality of notifications to a first user via a plurality of communication channels, the plurality of notifications indicating that a first task of the plurality of tasks is pending;
receiving, from a client device associated with the first user, a user selection of a notification from the plurality of notifications, the notification provided through a first communication channel from the plurality of communication channels; and
in response to receiving the user selection, providing a first display element of the one or more display elements to the client device through the first communication channel from the plurality of communication channels, wherein the first display element corresponds to the first task.

2. The method of claim 1, further comprising:
receiving, through the first communication channel, an update indicating a completion of the first task; and
in response to receiving the update, providing a second display element of the one or more display elements to the client device through the first communication channel, wherein the second display element corresponds to a second task of the plurality of tasks.

3. The method of claim 1, further comprising:
in response to receiving the user selection, providing a video chat transmitted between the client device and a support terminal via an additional communication channel; and
providing instructions causing the client device to display the first display element and the video chat concurrently.

4. The method of claim 1, wherein providing the first display element of the one or more display elements to the client device through the first communication channel comprises pushing the first display element to the client device through a Web Socket server.

5. The method of claim 1, wherein providing the plurality of notifications to the first user via the plurality of communication channels comprises providing a mobile application notification to a mobile device associated with the first user.

6. The method of claim 5, wherein providing the plurality of notifications to the first user via the plurality of communication channels comprises sending a notification email to an email address associated with the first user, wherein the notification email comprises a link to the first display element.

7. The method of claim 1, wherein each display element of the one or more display elements comprises at least one of:
   an informational video;
   an informational document;
   a signature pad;
   a digital fillable form;
   terms accompanied by an option to accept or reject the terms; or
   an interface for capturing and sending images of a check.

8. The method of claim 7, wherein each display element of the one or more display elements further comprises a selectable option configured to, when selected, initiate a video chat between the client device and a support terminal.

9. The method of claim 1, further comprising:
   receiving, through the first communication channel, an update indicating a completion of the workflow; and
   in response to receiving the update, generating a session review report comprising a summary of the plurality of tasks and user interactions detected by the client device, wherein the user interactions correspond to the plurality of tasks.

10. The method of claim 1, further comprising:
    providing an additional notification for a second task of the plurality of tasks to a second user via an additional communication channel;
    receiving, from a second client device associated with the second user, a second user selection of the additional notification; and
    in response to receiving the second user selection, providing a second display element of the one or more display elements to the second client device through the additional communication channel, wherein the second display element corresponds to the second task.

11. The method of claim 10, wherein the second task is different from the first task.

12. The method of claim 1, further comprising:
    receiving, through the first communication channel, an update indicating a rejection of the first task by the first user;
    in response to receiving the update indicating the rejection, reassigning the first task to a second user;
    providing an additional notification for the first task to the second user via an additional communication channel;
    receiving, from a second client device associated with the second user, a second user selection of the additional notification; and
    in response to receiving the second user selection, providing the first display element to the second client device through additional communication channel.

13. A non-transitory computer readable storage medium storing instructions that, when executed by at least one processor, cause a computing device to:
    generate a workflow comprising a plurality of tasks;
    generate one or more display elements corresponding to the plurality of tasks;
    provide a plurality of notifications to a first user via a plurality of communication channels, the plurality of notifications indicating that a first task of the plurality of tasks is pending;
    receive, from a client device associated with the first user, a user selection of a notification from the plurality of notifications, the notification provided through a first communication channel from the plurality of communication channels; and
    in response to receiving the user selection, provide a first display element of the one or more display elements to the client device through the first communication channel from the plurality of communication channels, wherein the first display element corresponds to the first task.

14. The non-transitory computer readable storage medium of claim 13, further comprising instructions that, when executed by the at least one processor, cause the computing device to:
    receive, through the first communication channel, an update indicating a completion of the first task; and
    in response to receiving the update, provide a second display element of the one or more display elements to the client device through the first communication channel, wherein the second display element corresponds to a second task of the plurality of tasks.

15. The non-transitory computer readable storage medium of claim 13, further comprising instructions that, when executed by the at least one processor, cause the computing device to:
    in response to receiving the user selection, provide a video chat transmitted between the client device and a support terminal via an additional communication channel; and
    provide instructions causing the client device to display the first display element and the video chat concurrently.

16. The non-transitory computer readable storage medium of claim 13, further comprising instructions that, when executed by the at least one processor, cause the computing device to:
    receive, through the first communication channel, an update indicating a rejection of the first task by the first user;
    in response to receiving the update indicating the rejection, reassign the first task to a second user;
    provide an additional notification for the first task to the second user via an additional communication channel;
    receive, from a second client device associated with the second user, a second user selection of the additional notification; and
    in response to receiving the second user selection, provide the first display element to the second client device through the additional communication channel.

17. A system comprising:
    at least one processor; and
    a non-transitory computer readable storage medium storing instructions that, when executed by the at least one processor, cause the system to:
    generate a workflow comprising a plurality of tasks;
    generate one or more display elements corresponding to the plurality of tasks;
    provide a plurality of notifications to a first user via a plurality of communication channels, the plurality of notifications indicating that a first task of the plurality of tasks is pending;

receive, from a client device associated with the first user, a user selection of a notification from the plurality of notifications, the notification provided through a first communication channel from the plurality of communication channels; and in response to receiving the user selection, provide a first display element of the one or more display elements to the client device through the first communication channel from the plurality of communication channels, wherein the first display element corresponds to the first task.

18. The system of claim 17, further comprising instructions that, when executed by the at least one processor, cause the system to:

receive, through the first communication channel, an update indicating a completion of the first task; and in response to receiving the update, provide a second display element of the one or more display elements to the client device through the first communication channel, wherein the second display element corresponds to a second task of the plurality of tasks.

19. The system of claim 17, further comprising instructions that, when executed by the at least one processor, cause the system to:

in response to receiving the user selection, provide a video chat transmitted between the client device and a support terminal via an additional communication channel; and provide instructions causing the client device to display the first display element and the video chat concurrently.

20. The system of claim 17, wherein each display element of the one or more display elements further comprises a selectable option configured to, when selected, initiate a video chat between the client device and a support terminal.

* * * * *